(12) United States Patent
Sundaram et al.

(10) Patent No.: US 12,208,441 B2
(45) Date of Patent: Jan. 28, 2025

(54) FABRICATION MATERIALS AND PROCESSES USEFUL TO FORM STRUCTURES IN SOFT MATERIALS

(71) Applicant: Trustees of Boston University, Boston, MA (US)

(72) Inventors: Subramanian Sundaram, Allston, MA (US); Christopher S. Chen, Newton, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 18/422,963

(22) Filed: Jan. 25, 2024

(65) Prior Publication Data

US 2024/0253108 A1 Aug. 1, 2024

Related U.S. Application Data

(60) Provisional application No. 63/481,832, filed on Jan. 27, 2023.

(51) Int. Cl.
*B22C 9/04* (2006.01)
*B22C 7/02* (2006.01)
(Continued)

(52) U.S. Cl.
CPC ............. *B22C 9/043* (2013.01); *B22C 7/02* (2013.01); *B29C 33/3842* (2013.01); *B29C 33/405* (2013.01); *B29C 39/003* (2013.01)

(58) Field of Classification Search
CPC ......... B22C 7/02; B22C 9/043; B29C 39/003; B29C 2033/422; B29C 33/405; B29C 64/40; B29C 33/3842
See application file for complete search history.

(56) References Cited

U.S. PATENT DOCUMENTS

| 5,072,770 A | 12/1991 | Yodice |
| 5,494,096 A | 2/1996 | Gonalons et al. |

(Continued)

FOREIGN PATENT DOCUMENTS

| CN | 102614034 B | 10/2014 |
| WO | 2024/159025 A1 | 8/2024 |

OTHER PUBLICATIONS

International Search Report and Written Opinion received for PCT Patent Application No. PCT/US2024/012967, mailed on Apr. 5, 2024, 13 pages.

(Continued)

*Primary Examiner* — Stella K Yi
(74) *Attorney, Agent, or Firm* — Hamilton, Brook, Smith & Reynolds, P.C.

(57) ABSTRACT

Methods and materials for forming a three-dimensional (3D) structure in a material are described. An example method includes directing a liquid casting material into a mold cavity of a mold structure, where the mold cavity corresponds to a three-dimensional (3D) structure. The method further includes causing the liquid casting material to solidify within the mold cavity to form a solid structure of the casting material, removing at least a portion of the mold structure from the solid structure of the casting material, and forming a structural material around the solid structure of the casting material. The solid casting material is liquified within the structural material. The liquified casting material is evacuated from the structural material to form the 3D structure in the structural material.

30 Claims, 28 Drawing Sheets
(12 of 28 Drawing Sheet(s) Filed in Color)

(51) Int. Cl.
  B29C 33/38   (2006.01)
  B29C 33/40   (2006.01)
  B29C 39/00   (2006.01)

(56) References Cited

U.S. PATENT DOCUMENTS 6,360,809 B1   3/2002   Cornie et al.
2002/0102519 A1   8/2002   Baum et al.

OTHER PUBLICATIONS

Arakawa et al., "Multicellular Vascularized Engineered Tissues through User-Programmable Biomaterial Photodegradation", Advanced Material, vol. 29, No. 37, Oct. 2017, pp. 1703156(1-9).

Bertassoni et al., "Hydrogel bioprinted microchannel networks for vascularization of tissue engineering constructs", Lab on a Chip, vol. 14, No. 13, Jul. 2014, pp. 2202-2211.

Bico et al., "Elastocapillarity: When Surface Tension Deforms Elastic Solids", Annual Review of Fluid Mechanics, vol. 50, Mar. 2018, pp. 629-659.

Brandenberg et al., "In Situ Patterning of Microfluidic Networks in 3D Cell-Laden Hydrogels", Adv. Mater., vol. 28, No. 34, Sep. 2016, pp. 7450-7456.

Buckberg et al., "Cardiac Mechanics Revisited: The Relationship of Cardiac Architecture to Ventricular Function", Circulation, vol. 118, No. 24, Dec. 2008, pp. 2571-2587.

Daly et al., "Bioprinting for the Biologist", Cell, vol. 184, No. 1, Jan. 2021, pp. 18-32.

Doyle et al., "Generation of 3D Collagen Gels with Controlled Diverse Architectures", Curr. Protoc. in Cell Biol., Supplement 72, Sep. 2016, 16 pages.

Grigoryan et al., "Multivascular networks and functional intravascular topologies within biocompatible hydrogels", Science, vol. 364, No. 6439, May 2019, pp. 458-464.

Hardy, "The Surface Tension of Liquid Gallium", Journal of Crystal Growth, vol. 71, Issue 3, May-Jun. 1985, pp. 602-606.

Jiménez-Torres et al., "LumeNEXT: A Practical Method to Pattern Luminal Structures in ECM Gels", Adv. Healthc Mater., vol. 5, No. 2, Jan. 2016, pp. 198-204. First published: Nov. 26, 2015.

Keating et al., "Toward site-specific and self-sufficient robotic fabrication on architectural scales", Science Robotics, vol. 2, No. 5, Apr. 2017, pp. 1-15.

Khan et al., "Giant and switchable surface activity of liquid metal via surface oxidation", PNAS, vol. 111, No. 39, Sep. 2014, pp. 14047-14051.

Kleiman et al., "Determination of Factors Influencing the Wet Etching of Polydimethylsiloxane Using Tetra-n-butylammonium Fluoride", Macromol. Chem. Phys., vol. 217, Issue 2, Jan. 2016, pp. 284-291. Published online: Sep. 10, 2015; DOI: 10.1002/macp.201500225.

Kolesky et al., "Three-dimensional bioprinting of thick vascularized tissues", PNAS, vol. 113, No. 12, Mar. 2016, pp. 3179-3184.

Lee et al., "3D bioprinting of collagen to rebuild components of the human heart", Science, vol. 365, Aug. 2019, pp. 482-487.

Lin et al., "Vacuum filling of complex microchannels with liquid metal", Lab on a Chip, vol. 17, 2017, pp. 3043-3050.

Ma et al., "Shaping a Soft Future: Patterning Liquid Metals", Advanced Materials, vol. 35, May 2023, pp. 2205196 (1-31).

McKinnon et al., "Design and Characterization of a Synthetically Accessible, Photodegradable Hydrogel for User-Directed Formation of Neural Networks", Biomacromolecules, vol. 15, No. 7, Jul. 2014, pp. 2808-2816.

Miller et al., "Rapid casting of patterned vascular networks for perfusable engineered three-dimensional tissues", Nature Materials, vol. 11, Sep. 2012, pp. 768-774.

Murray, "The Physiological Principle of Minimum Work: I. The Vascular System and the Cost of Blood Volume", Proc. Natl. Acad. Sci. U.S.A., vol. 12, Jan. 1926, pp. 207-214.

O'Connor et al., "Engineering the multiscale complexity of vascular networks", Nature, vol. 7, Sep. 2022, pp. 702-716.

Polacheck et al., "Microfabricated blood vessels for modeling the vascular transport barrier", Nature Protocols, vol. 14, May 2019, pp. 1425-1454.

Pourbaix, Atlas of Electrochemical Equilibria in Aqueous Solutions, Section 16.1: "GALLIUM(1)" by Vanleugenhaghe et al., NACE International, 1958, pp. 428-435.

Pradhan et al., "Fundamentals of Laser-Based Hydrogel Degradation and Applications in Cell and Tissue Engineering", Adv. Healthcare Mater., vol. 6, No. 24, Dec. 2017, pp. 1700681(1-28).

Runions et al., "Modeling and visualization of leaf venation patterns", ACM Transactions on Graphics (TOG), vol. 24, Iss. 3, Jul. 2005, pp. 702-711.

Runions et al., "Modeling Trees with a Space Colonization Algorithm", Eurographics Workshop on Natural Phenomena, Jan. 2007, 9 pages.

Sherman, "On Connecting Large Vessels to Small: The Meaning of Murray's Law", J. Gen. Physiol., vol. 78, No. 4, Oct. 1981, pp. 431-453.

Skylar-Scott et al., "Biomanufacturing of organ-specific tissues with high cellular density and embedded vascular channels", Sci. Adv., vol. 5, No. 9, Sep. 2019, 13 pages.

Style et al., "Elastocapillarity: Surface Tension and the Mechanics of Soft Solids", Annual Review of Condensed Matter Physics, vol. 8, Mar. 2017, pp. 99-118.

Tang et al., "Gallium Liquid Metal: The Devil's Elixir", Annual Review of Materials Research, vol. 51, Jul. 2021, pp. 381-408.

Traore et al., "Tissue Engineering the Vascular Tree", Tissue Engineering: Part B Rev., vol. 23, No. 6, Dec. 2017, pp. 505-514.

Truby et al., "Printing soft matter in three dimensions", Nature, vol. 540, Dec. 2016, pp. 371-378.

Walker et al., "A passive pumping method for microfluidic devices", Lab on a Chip, vol. 2, No. 3, 2002, pp. 131-134.

Wang et al., "Endothelial Cell Sensing of Flow Direction", Arteriosclerosis, Thrombosis, and Vascular Biology, vol. 33, No. 9, Sep. 2013, pp. 2130-2136.

Weibel, "It Takes More than Cells to Make a Good Lung", American Journal of Respiratory and Critical Care Medicine, vol. 187, No. 4, Feb. 2013, pp. 342-346.

Zheng et al., "In vitro microvessels for the study of angiogenesis and thrombosis", PNAS, vol. 109, No. 24, Jun. 2012, 9342-9347.

Zheng et al., "Ultralight, Ultrastiff Mechanical Metamaterials", Science, vol. 344, Iss. 6190, Jun. 2014, pp. 1373-1377.

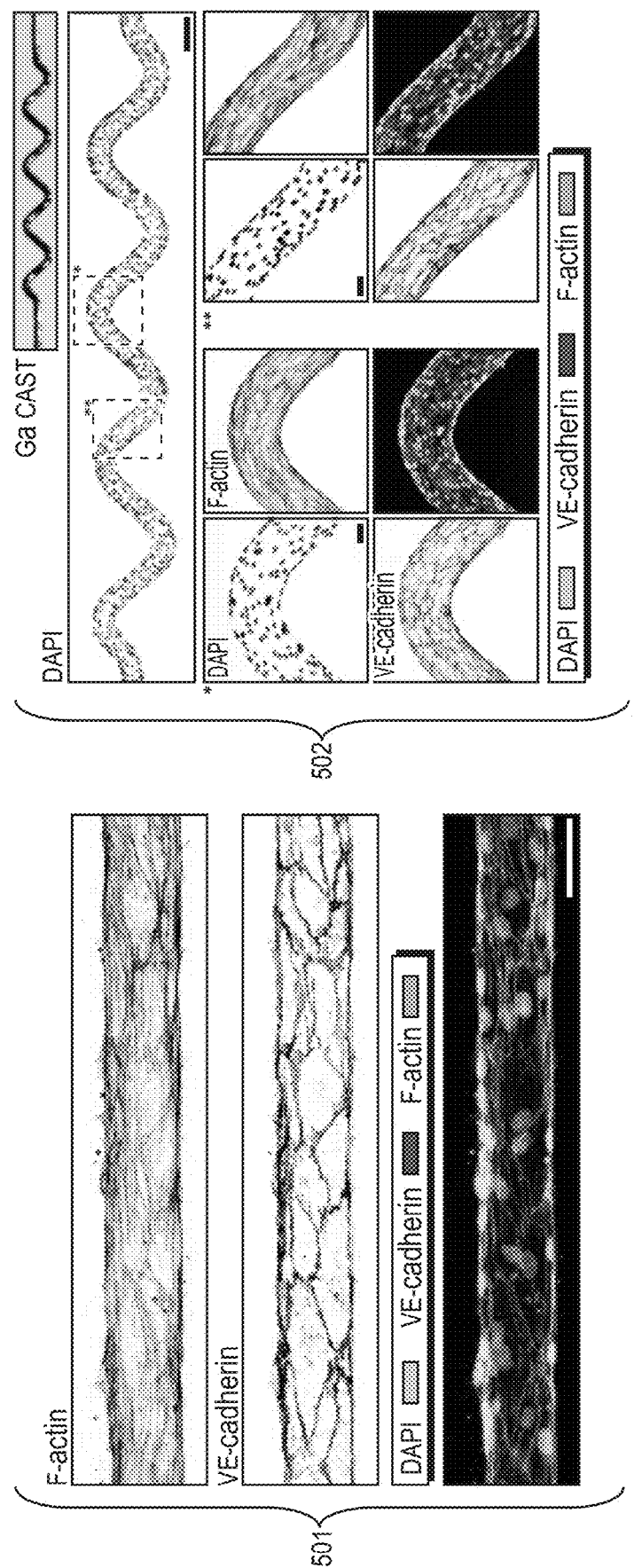

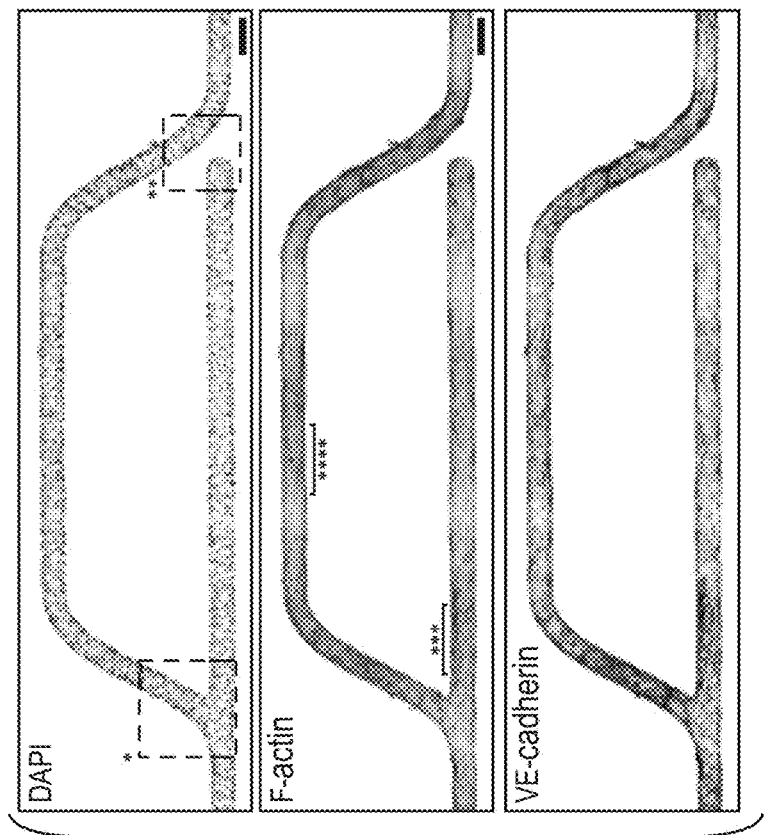
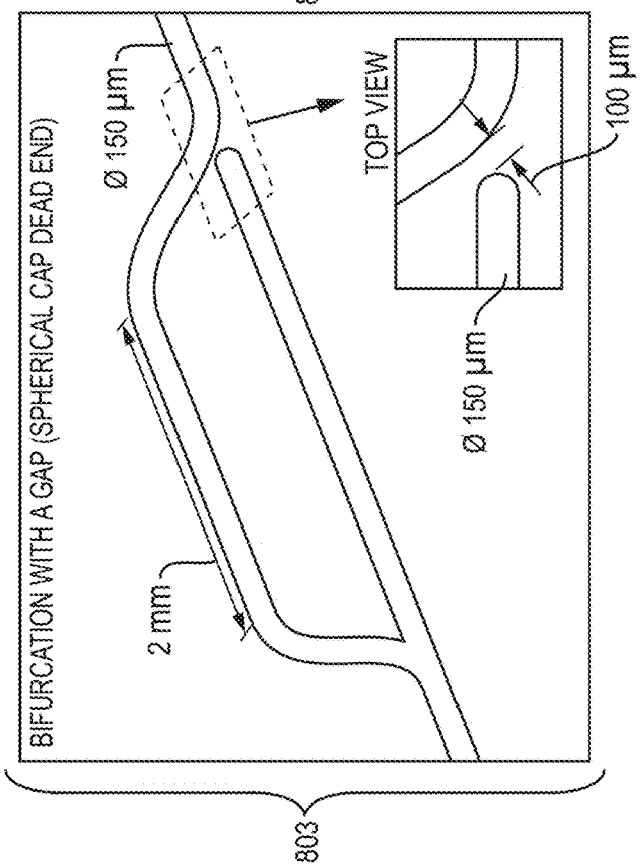
FIG. 8D
FIG. 8C

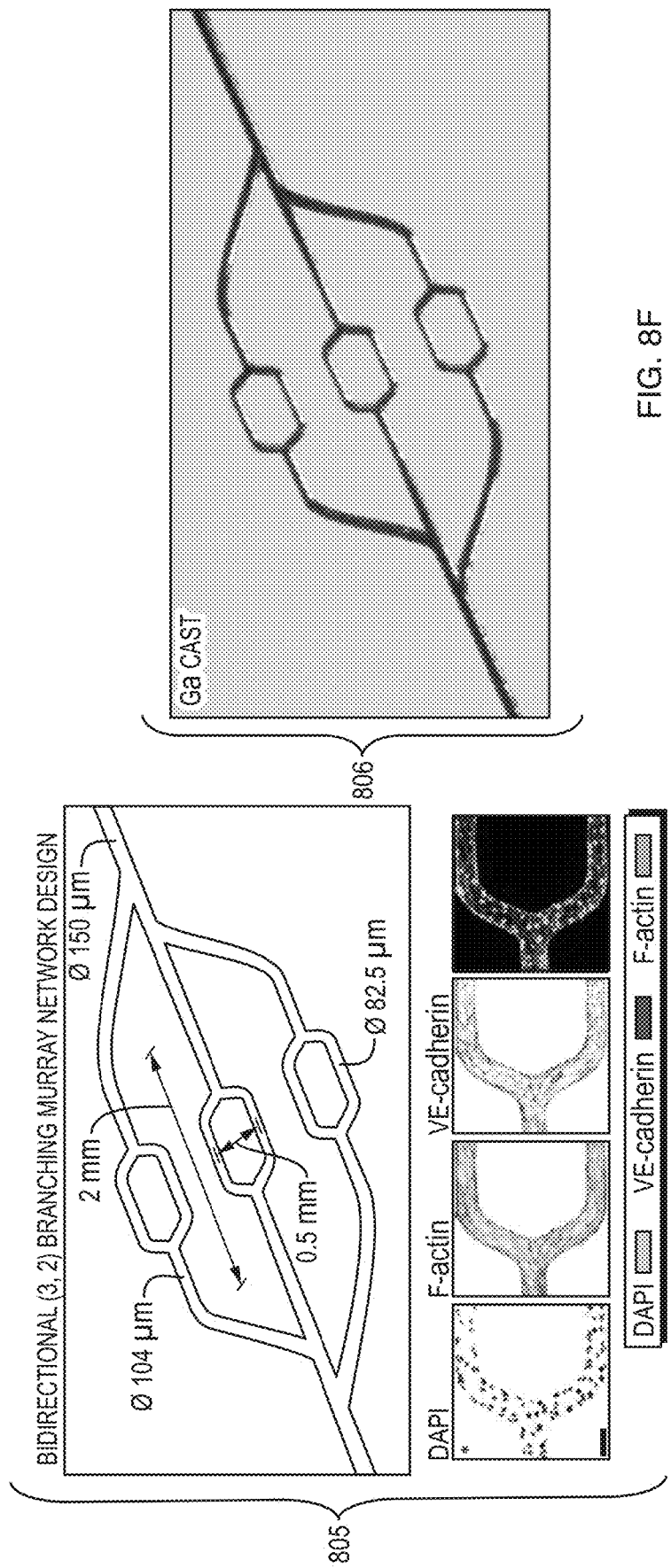

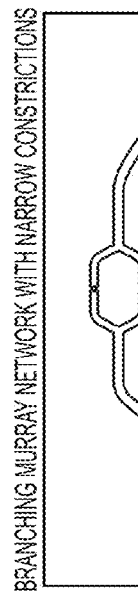
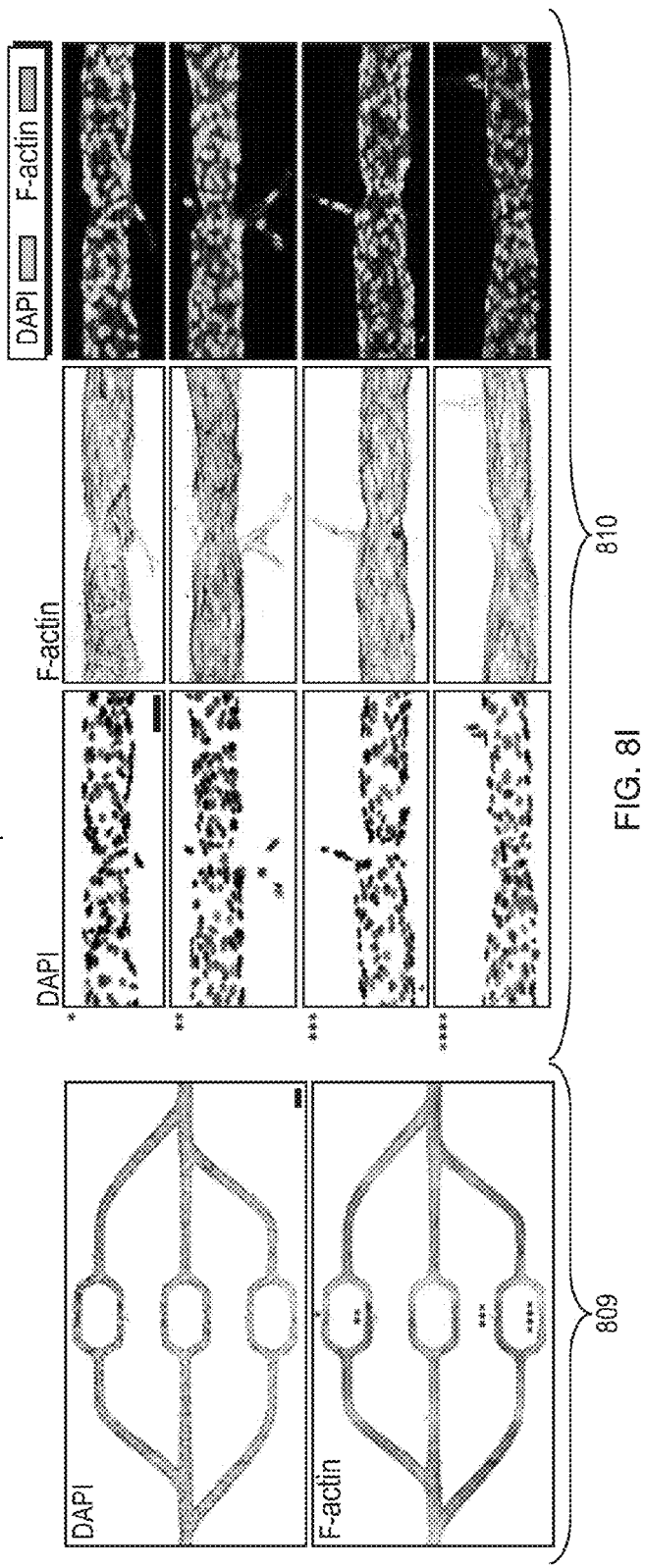
FIG. 8H
FIG. 8I

PDMS STRUCTURE (TOP VIEW)
904

Ga KNOT (TOP VIEW)
906

PDMS STRUCTURE (SIDE VIEW)
905

907
SIDE VIEW — MP-DAPI
TOP VIEW

FABRICATION MATERIALS AND PROCESSES USEFUL TO FORM STRUCTURES IN SOFT MATERIALS

RELATED APPLICATION

This application claims the benefit of U.S. Provisional Application No. 63/481,832, filed on Jan. 27, 2023. The entire teachings of the above application are incorporated herein by reference.

GOVERNMENT SUPPORT

This invention was made with government support under Contract No. EEC-1647837 awarded by the National Science Foundation. The government has certain rights in the invention.

BACKGROUND

In biological tissues, a variety of cells and extracellular materials come together, forming intricate structures that span various length scales, ranging from the sub-cellular dimensions of around μm to the scale of whole organs, typically measuring in centimeters. These arrangements play a pivotal role in regulating essential biological functions [1-2]. The methods employed to engineer tissue structures have seen significant progress. Notable advancements include the creation of large-scale constructs through techniques like stereolithography [3] and nozzle-based bioprinting [4-5]. Simultaneously, subcellular (high-resolution) patterning has been accomplished through processes involving the removal of materials (or subtractive processes), such as photoablation [6-8]. Despite this notable progress, there are limitations on the capabilities of additive bioprinting technologies, particularly for achieving features at the sub-nozzle or voxel level [9]. The application of subtractive techniques like photoablation is currently limited to small volumes due to the hurdles posed by heat generation and time constraints [10]. Confronting the scientific and engineering communities is the formidable challenge of building across multiple length scales simultaneously, all while dealing with the extreme temperature and environmental constraints of soft biological materials. This limitation currently prevents engineers from constructing numerous biological designs, such as hierarchical vascular and ductal trees with calibers that vary continuously; these designs cannot be fabricated readily with current technologies [11-12].

SUMMARY

Embodiments disclosed herein relate to materials and processes useful for forming structures in materials, including soft materials, rigid materials, biomaterials and/or non-biomaterials.

A method of forming a three-dimensional (3D) structure in a material. The method includes directing a liquid casting material into a mold cavity of a mold structure, where the mold cavity corresponds to a three-dimensional (3D) structure. The method further includes causing the liquid casting material to solidify within the mold cavity to form a solid structure of the casting material, removing at least a portion of the mold structure from the solid structure of the casting material, and forming a structural material around the solid structure of the casting material. The solid casting material is liquified within the structural material. The liquified casting material is evacuated from the structural material to form the 3D structure in the structural material.

The mold structure can include a soft material, an elastomer mold, or any combination thereof. In general, any 'sacrificial' soft material that can be removed, at least in part, from the solid structure of the casting material can be used.

For example, the structural material can include a soluble material, an etchable material, a porous material, a soft biomaterial, a hydrogel, a gel, a material allowing a base or an acid to flow through said material, or any combination thereof.

In an embodiment, creating the mold cavity includes forming a solid mold of a 3D biological structure, encasing the solid mold in an elastomer to form an elastomer mold, and separating the solid mold from the elastomer to create the mold cavity in the elastomer mold.

In an embodiment, forming the solid mold includes designing a mold cavity geometry to allow for the liquid casting material to be evacuated from the structural material as a unitary piece or droplet, such that the casting material maintains continuity throughout the evacuation, and forming the 3D mold according to the designed mold cavity geometry.

In an embodiment, evacuating the liquid casting material includes increasing a surface tension of the liquified casting material, the increasing of the surface tension of the liquified casting material causes a Laplacian pressure difference in the liquified casting material. Then, the liquid casting material is extracted from the structural material by using capillary forces, the capillary forces are dependent on the Laplacian pressure difference.

For example, the surface tension of the liquid casting material can be increased by removing a surface oxide of the liquified casting material.

For example, the surface tension of the liquid casting material can be increased by exposing the liquid cast material to an acid or a base.

For example, the surface tension of the liquid casting material can be increased by exposing the liquid casting material to an electrical current or voltage.

For example, the surface tension of the liquid casting material can be increased by exposing the liquid casting material to a mechanical force.

For example, the surface tension of the liquid casting material can be increased by exposing the liquid casting material to a vibration.

For example, the structural material formed around the solid structure of the cast material can include at least one pore configured to allow for the insertion or removal of a viscous material.

In an embodiment, the 3D structure includes a geometry containing closed-loop geometries, the method further includes designing at least one narrow continuous wall under the structure for support.

In an embodiment, evacuating the liquid casting material includes causing a bulb of the liquid casting material to collect at an exit of the structural material to prevent the internal pressure of the liquid cast material from deforming the structural material.

For example, the casting material can include a metal.

For example, the casting material can be characterized by a melting point within a specified proximity of temperature to that of a predefined cell culture.

For example, the casting material can include a tunable surface oxide, wherein removing the tunable surface oxide increases the surface tension of the casting material enabling the use of capillary forces to demold the 3D structure via extraction of the casting material.

In an embodiment, the casting material has a coefficient of surface tension, wherein liquifying the casting material and increasing its surface tension causes a Laplacian pressure difference throughout the liquid casting material and allowing the liquid casting material to evacuate the structural material in a unitary piece or droplet.

For example, the metal can be Gallium.

For example, the 3D structure can be a multiscalar biological structure.

The method of forming a 3D structure can further include inserting biological cells into the 3D structure in the structural material, or on the surface of the 3D structure, thereby forming an artificial biological structure.

A method of forming a multiscalar, three-dimensional (3D) structure in a material includes causing a liquid casting material to solidify within a mold cavity of an elastomer mold to form a solid structure of the casting material within the mold cavity, the mold cavity corresponding to a multiscalar, three-dimensional (3D) structure. The method includes separating the elastomer mold and the solid structure of the casting material, forming a structural material around the solid structure of the casting material, liquifying the solid casting material within the structural material, and evacuating the liquified casting material from the structural material, creating a hollow interior having the multiscalar, 3D structure within the structural material.

The multiscalar, 3D structure can include any branched (ductal) tree structure, and the hollow interior of the structural material includes a hollow form of the branched (ductal) tree structure.

For example, the multiscalar, 3D structure can include a branched vessel having one or more branches obeying Murray's Law.

In an embodiment, the multiscalar, 3D structure includes a vessel having groves to control alignment of, or behavior of biological cells added to the vessel.

In an embodiment, evacuating the liquid casting material includes increasing surface tension of the liquified casting material by removing a surface oxide of the liquified casting material, the increasing of the surface tension of the liquified casting material causing a Laplacian pressure difference in the liquified casting material, and extracting the liquid casting material from the structural material by using capillary forces that are dependent on the Laplacian pressure difference.

For example, a concentration of sodium hydroxide can be used to remove the surface oxide of the liquified casting material.

The method of forming a multiscalar, 3D structure can include creating the mold cavity by designing a 3D mold of a biological structure, encasing the 3D mold in an elastomer, and removing the 3D mold from the elastomer, creating a cavity of the 3D mold in the elastomer.

The method can further include inserting biological materials into the hollow interior of the structural material, thereby forming an artificial biological structure. For example, the biological materials can be biological cells or biomaterials or a combination of biological cell and biomaterials.

The method can further include the structural material including a soluble material, an etchable material, a porous material, a soft biomaterial, a hydrogel, a gel, a material allowing a base or an acid to flow through said material, or any combination thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 5A-5F illustrate various endothelialized structures, vessel topologies, and fine features.

FIGS. 8A-8I illustrate embodiments depicting endothelialized vessels.

DETAILED DESCRIPTION

Figure 1B:
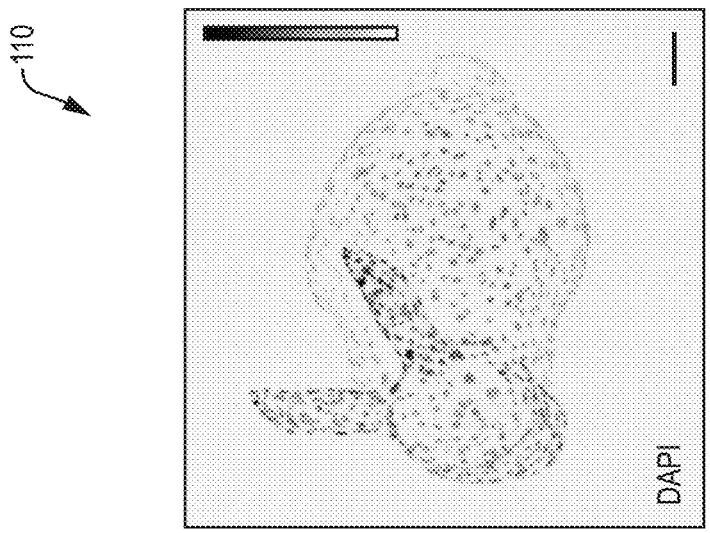
FIG. 1B is a representation of a three-dimensional (3D) structure produced using the process of FIG. 1A and including biological cells inserted into the structure.

A description of example embodiments follows.

Many printing technologies are employed to construct intricate three dimensional (3D) shapes spanning from the nanoscale to large architectural scales [13-15]. Of these technologies, very few operate in conditions suitable for cells and natural extracellular matrices (ECMs) or produce structures where cells can survive and function well. With the goal of building multiscalar biological structures, molding approaches have been investigated to replicate 3D shapes into soft natural ECMs like collagen and fibrin. One notable advantage of these molding methods is that they are independent of how the original molds are constructed. Therefore, such templating strategies have the potential to broaden the spectrum of useful fabrication processes, including those that are non-biocompatible, for creating intricate molds used in the fabrication of biological structures. The molding of soft ECMs using both soft and rigid templates has been explored previously [16-19]. However, there is still need for a unified approach that can mold both high-resolution (micron-scale) and larger millimeter-scale 3D features including multiscalar 3D features. Other templating methods such as those employing photolithography can achieve a wide range of in-plane dimensions, but typically with only a single out-of-plane thickness [20]. Consequently, they are more suitable for molding 2.5D geometries that lack overhangs, rather than true 3D structures. In essence, molding processes present a challenge in balancing conflicting requirements for the mechanical properties of the ideal templating material. Rigid templates can achieve high accuracy in molding small features but can be challenging to remove without causing damage to the surrounding soft material, particularly in the context of 3D molds. Conversely, soft templates are easier to demold but struggle to replicate microscale features with precision.

Embodiments disclosed herein use gallium-based engineered sacrificial capillary pumps for evacuation (ESCAPE) during molding and demonstrate the ability to generate multiscalar structures in soft natural hydrogels achieving both sub-cellular (<10 μm) and mm-scale features. By separating the biomaterial of interest from the process of shaping the geometry, one can leverage non-biocompatible tools to establish the initial structure. For instance, using this approach, branched, cell-laden vascular trees within collagen, transitioning from approximately 300 μm arterioles down to the microvasculature (around 10 times smaller) were crafted. This approach is also capable of generating intricate structures. To illustrate this, topographical cues were introduced on the inner surface of vascular walls, guiding cells in three-dimensional (3D) orientations, and build vascular malformations. The utilization of ESCAPE molding facilitates the creation of multiscalar forms in soft biomaterials. This approach provides the groundwork for constructing many tissue architectures that were previously unattainable in vitro.

Until now, multiscalar forms have posed significant challenges for fabrication in natural materials. These multiscalar forms are essential for controlling biological functions in engineered tissues. Embodiments introduce a potent new approach to fabricate multiscalar shapes using gallium ESCAPE molding. To aid the design process, guidelines were developed to form casts and extract them through capillary forces. By simulating gallium ESCAPE, one may incorporate efficient capillary withdrawal as a design metric, which can be instrumental in the development of future tissue constructs utilizing gallium ESCAPE. Whereas many embodiments disclosed herein emphasize multiscalar vascular forms to showcase the capabilities of the ESCAPE process, the newfound capability to precisely control microscale geometry and construct hierarchical designs paves the way for innovative possibilities in crafting a wide range of organotypic designs and tissue architectures.

Figure 1A:
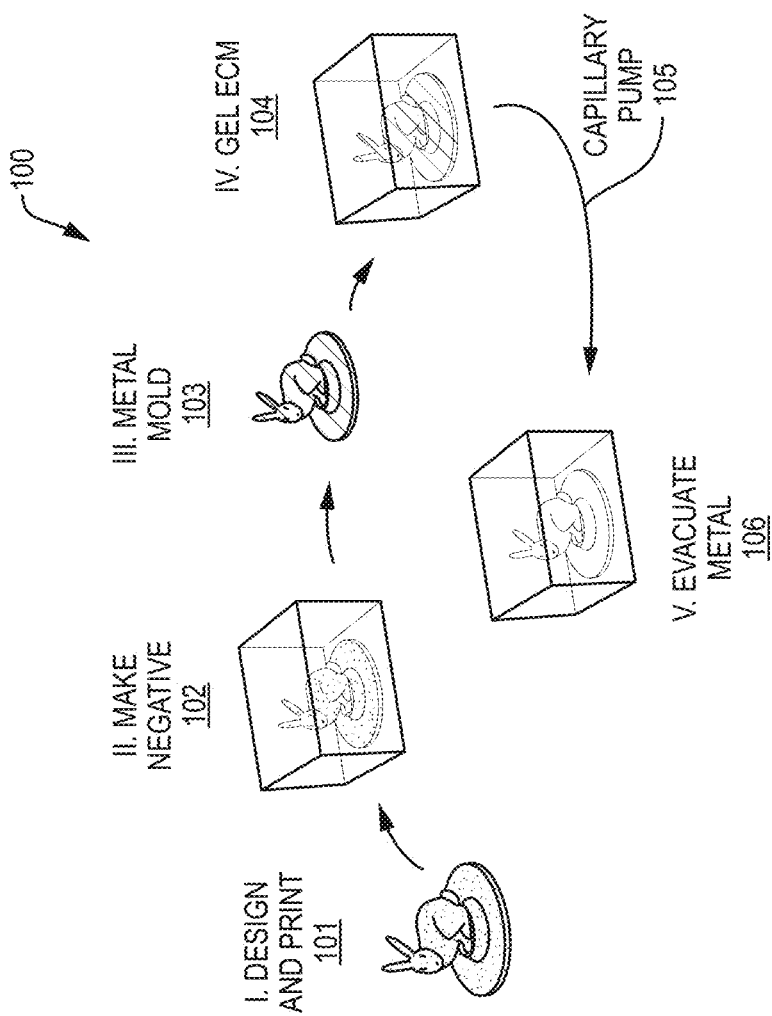
FIG. 1A is a schematic representation of a process that uses capillary pumps to create high-resolution copies of multiscalar structures in soft materials according to an example embodiment.

FIG. 1A is a schematic representation 100 of a process that uses capillary pumps to create high-resolution copies of multiscalar structures in soft materials, according to an embodiment. By decoupling the material used for achieving resolution and complexity from the final material of choice such as soft natural extracellular matrices (ECM) materials suitable for 3D cell culture. Engineered sacrificial capillary pumps for evacuation (ESCAPE)-molding process steps are as follows. The intended design is first fabricated using any process 101 and copied into a gallium (Ga) cast through replica molding by making a negative 102, and the metal (according to embodiments, Gallium) mold 103. Soft ECMs are polymerized around the solid gallium cast 104. At the heart of this fabrication method is the use of capillary pumps 105 to extract gallium in its liquid form without disturbing the soft material 106.

FIG. 1B is a representation 110 of a three-dimensional structure provided using the process of FIG. 1A and including biological cells inserted into the structure, according to an embodiment. Upon gallium removal, cells are seeded into the three-dimensional structure shaped cavity. The image shows a depth-coded projection of cell nuclei labelled with DAPI (DAPI, or 4',6-diamidino-2-phenylindole, is a fluorescent stain that binds strongly to adenine-thymine-rich regions in DNA). The scale bar represents 100 μm.

Figure 2:
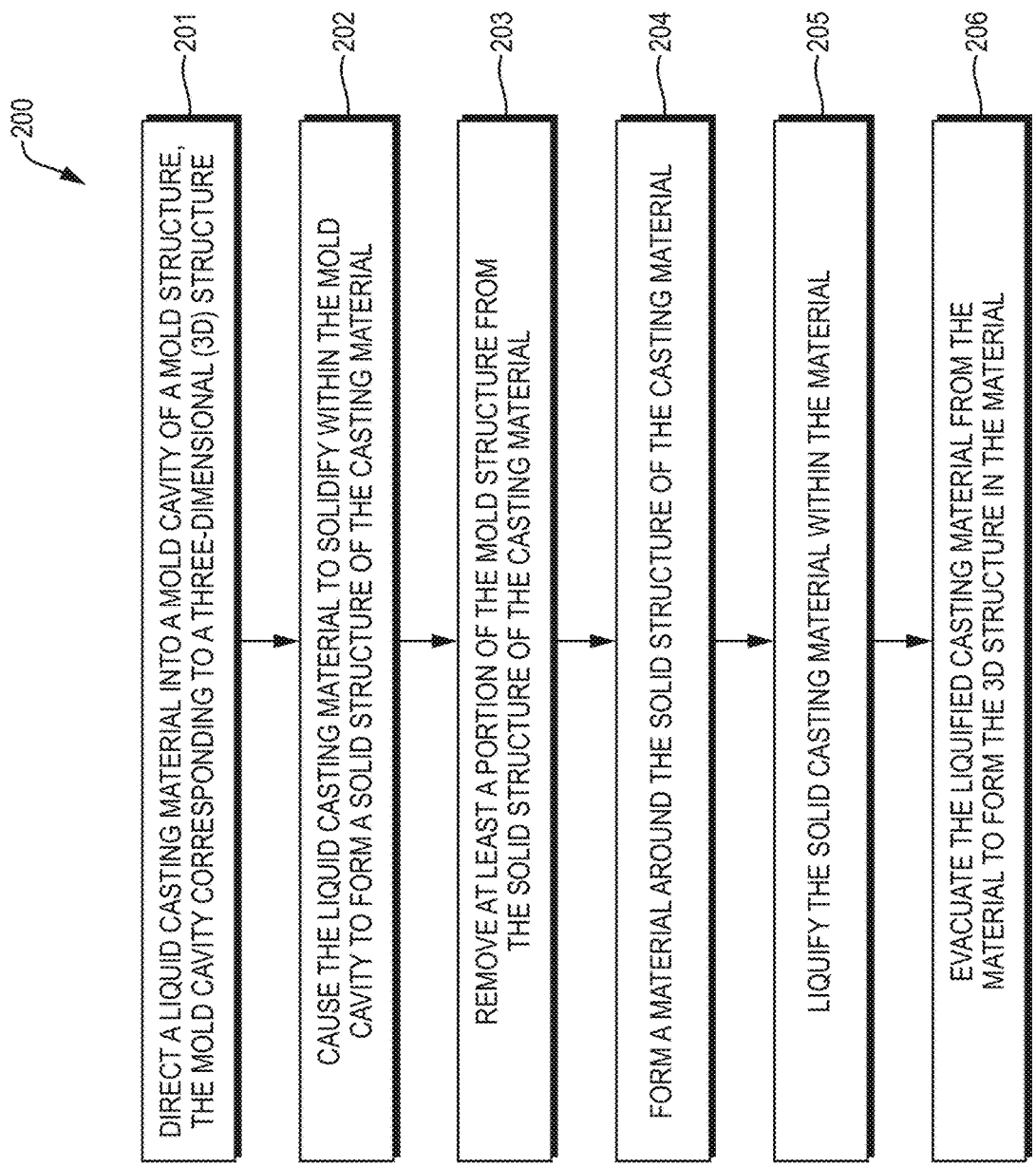
FIG. 2 is a flow diagram representing a method of forming a 3D structure in a structural material according to an example embodiment.

FIG. 2 is a flow diagram 200 representing a method of forming a three-dimensional (3D) structure in a material (such as a hydrogel, a soluble material, an etchable material, a porous material, a soft biomaterial, a hydrogel, a gel, a material allowing a base or an acid to flow through said material, or any combination thereof) according to an embodiment. The 3D structure may be a design such as a multiscalar biological structure (for example, FIGS. 6A-6C). The 3D structure may be a design comprising a self-intersecting structure, such as a closed-loop geometry, and will include a design of at least one narrow continuous wall under the structure for support (for example, FIGS. 9A-9H). The additional support may be necessary to make the geometry moldable. The method begins by directing 201 a liquid casting material, such as liquid metal, into a mold cavity of a mold structure, the mold cavity corresponding to a three-dimensional (3D) structure, such as a multiscalar, 3D biological structure (for example, 301b). The mold structure may comprise of a soft material, such as an elastomer mold, a soluble material, an etchable material, or any combination thereof. The mold cavity may be created by forming a solid mold of a 3D biological structure, encasing the solid mold in an elastomer to form the elastomer mold, and then separating the mold from the elastomer to create the mold cavity in the elastomer mold (for example, FIG. 3). The solid mold may be formed by designing a mold cavity geometry to allow for the liquid casting material to be evacuated from the material as a unitary piece or droplet, such that the casting material maintains continuity throughout the evacuation and then forming the 3D mold according to the designed mold cavity geometry (for example, FIG. 7B-7C).

Still referring to FIG. 2, the method then causes 202 the liquid casting material to solidify within the mold cavity to form a solid structure of the casting material (for example, 301b-c). The method then removes 203 at least a portion of the mold structure from the solid structure of the casting material (for example, 301c). Next, the method forms 204 a material, such as a hydrogel or structural material, around the solid structure of the casting material (for example, 301d, 302c, and 303c). The material formed around the solid structure of the cast material may include at least one pore configured to allow for the insertion or removal of a viscous material. Biological cells may be inserted into the 3D structure in the material, thereby forming an artificial biological structure. The method then liquifies 205 the solid casting material within the material. Lastly, the method evacuates 206, via a capillary pump according to an embodiment, the liquified casting material from the material to form the 3D structure in the material (for example, 301e, 302d and 303d). Evacuating the liquid casting material may comprise increasing a surface tension of the liquified casting material, the increasing of the surface tension of the liquified casting material may cause a Laplacian pressure difference in the liquified casting material and extracts the liquid casting material from the material by using capillary forces, wherein the capillary forces are dependent on the Laplacian pressure difference (for example, FIG. 4A). The surface tension of the liquid casting material may be increased by removing a surface oxide of the liquified casting material, by exposing the liquid cast material to an acid or a base (for example, a concentration of sodium hydroxide), by exposing the liquid casting material to an electrical current or voltage, by exposing the liquid casting material to a mechanical force, by exposing the liquid casting material to a vibration, or any combination thereof. Further, evacuating the liquid casting material may include causing a bulb of the liquid casting material to collect at an exit of the material to prevent the internal pressure of the liquid cast material from deforming the material (for example, FIG. 4B).

In some embodiments, the liquid casting material may be a metal, for example, gallium. Alternatively, the casting material may be characterized by a melting point within a specified proximity of temperature to that of a predefined cell culture. The casting material may include a tunable surface oxide, wherein removing the tunable surface oxide increases the surface tension of the casting material enabling the use of capillary forces to demold the 3D structure via extraction of the casting material. The casting material may have a coefficient of surface tension, wherein liquifying the casting material and increasing its surface tension causes a Laplacian pressure difference throughout the liquid casting material that allows the liquid casting material to evacuate the structural material in a unitary piece or droplet (for example, FIG. 7B-7C).

Figure 3:
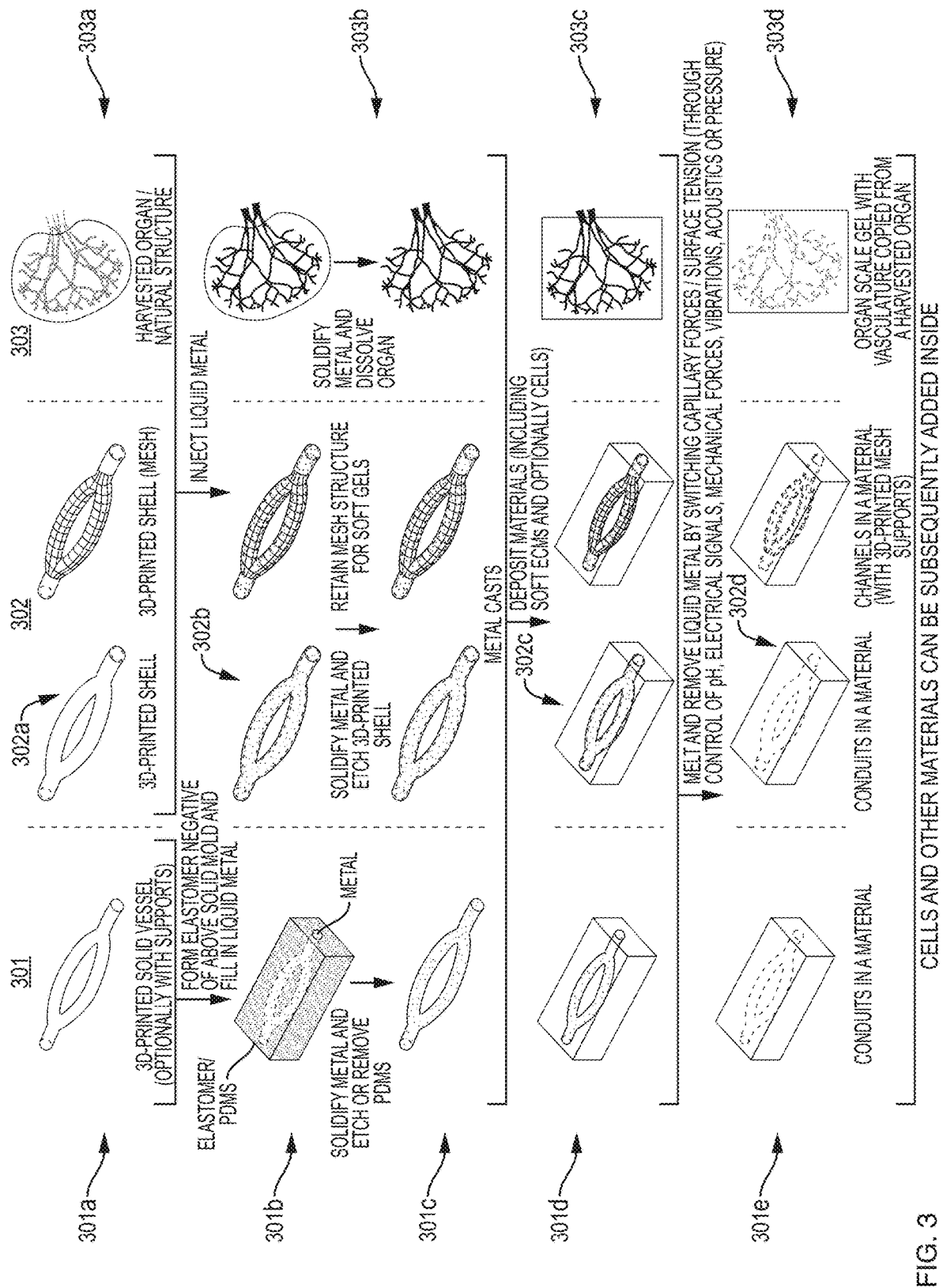
FIG. 3 is a diagram showing various processes of forming a three-dimensional structure in a material including obtaining a 3D mold, and turning it into conduits within the material, according to example embodiments.

FIG. 3 is a diagram showing various process 301, 302 and 303 of three methods (301a-e, 302a-d and 303a-d) for forming a three-dimensional (3D) structure in a material including obtaining a 3D mold, and turning it into conduits within the material, according to example embodiments. Method 301 begins with a 3D-printed vessel 301a. From there, an elastomer/polydimethylsiloxane (PDMS) negative is formed 301b above the solid mold, and is filled in with a liquid metal, for example gallium. In the next step, 301c, the metal is solidified, and the elastomer/PDMS is selectively etched away to reveal the metal cast. Next, a material, for example, a hydrogel or structural material, is formed 301d around the cast from step 301c. The metal is then liquified, for example, by melting the metal, and extracted using capillary forces and surface tension. The melting and/or extracting may be done through the use of a controlled acid or a base, electrical signals, mechanical forces, vibrations, acoustics or pressure. This leaves conduits 301e in the material. From there, cells and other materials can be subsequently added inside the mold.

Method 302 begins by obtaining the 3D printed shell 302a and injecting a liquid metal into the shell. Next, the metal is solidified 302b to create a metal cast. Materials, such as the soft ECM and cells are deposited 302c around the cast. From there, the metal is liquified for example, by melting the metal, and extracted using capillary forces and surface tension. The melting and/or extracting may be done through the use of a controlled acid, electrical signals, mechanical forces, vibrations, acoustics or pressure. This leaves conduits 302d in the material. From there, cells and other materials can be subsequently added inside the mold.

Method 303 begins by harvesting an organ or a natural biological structure 303a, in some embodiments this is a vasculature structure. Liquid metal is then injected into the structure 303a and is subsequently solidified at step 303b. The natural organ is dissolved around the structure, leaving the metal cast. Materials, such as a soft ECM, are deposited around the solid metal cast in step 303c. From there, the metal is liquified for example, by melting the metal, and extracted using capillary forces and surface tension. The melting and/or extracting may be done through the use of a controlled acid, electrical signals, mechanical forces, vibrations, acoustics or pressure. This leaves an organ scale 303d with a vasculature copied from the harvested organ in the material. From there, cells and other materials can be subsequently added inside the mold.

An additional embodiment includes a method of forming a multiscalar, three-dimensional (3D) structure in a material. The method includes first causing a liquid casting material to solidify within a mold cavity of an elastomer mold to form a solid structure of the casting material within the mold cavity (for example, 301a), the mold cavity may correspond to a multiscalar, three-dimensional (3D) structure. The mold cavity may be created by designing a 3D mold of a biological structure, encasing the 3D mold in an elastomer, and removing the 3D mold from the elastomer, creating a cavity of the 3D mold in the elastomer (for example, FIG. 3). Next, the method separates the elastomer mold and the solid structure of the casting material (for example, 301c), and then forms a material around the solid structure of the casting material (for example, 301d, 302c, and 303c). The method then liquefies the solid casting material within the material, and then evacuates the liquified casting material from the material, creating a hollow interior having the multiscalar, 3D structure within the material (for example, 301e, 302d, and 303d). Biological materials may be inserted into the hollow interior of the material, thereby forming an artificial biological structure.

Figure 6A:
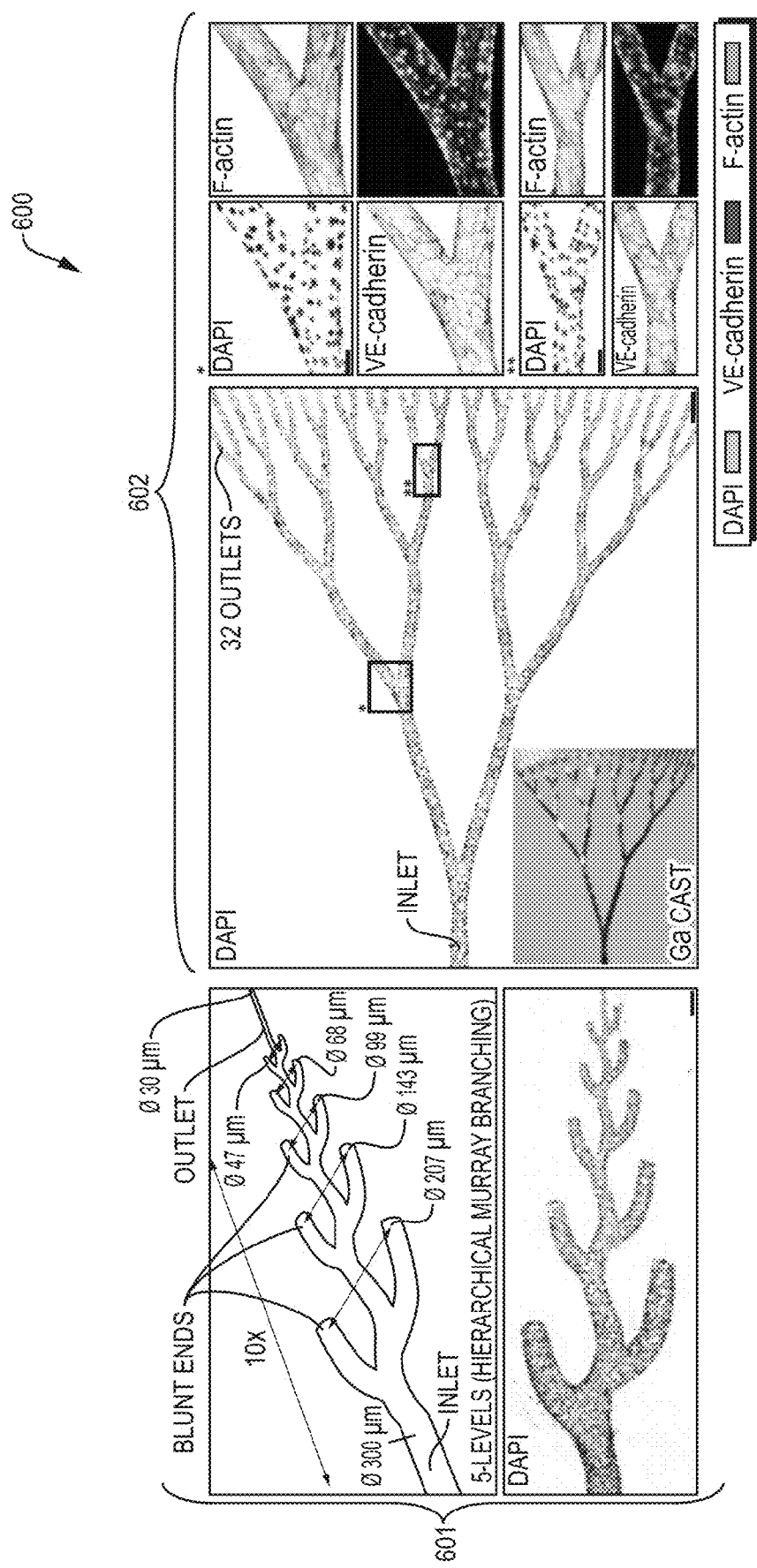
FIGS. 6A-6C illustrate hierarchical vascular trees and epithelial ducts.
Figure 6B:
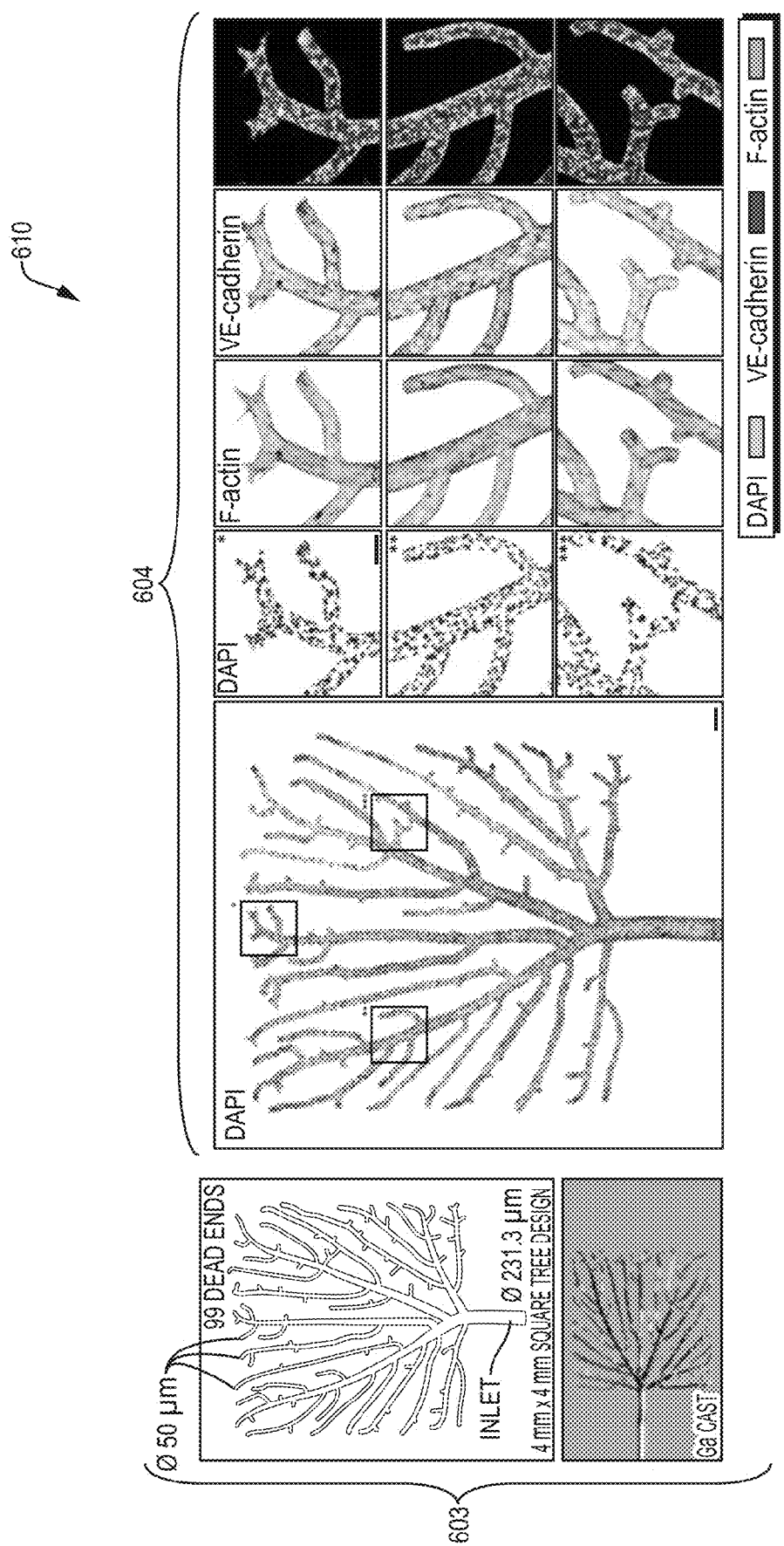
Figure 6C:
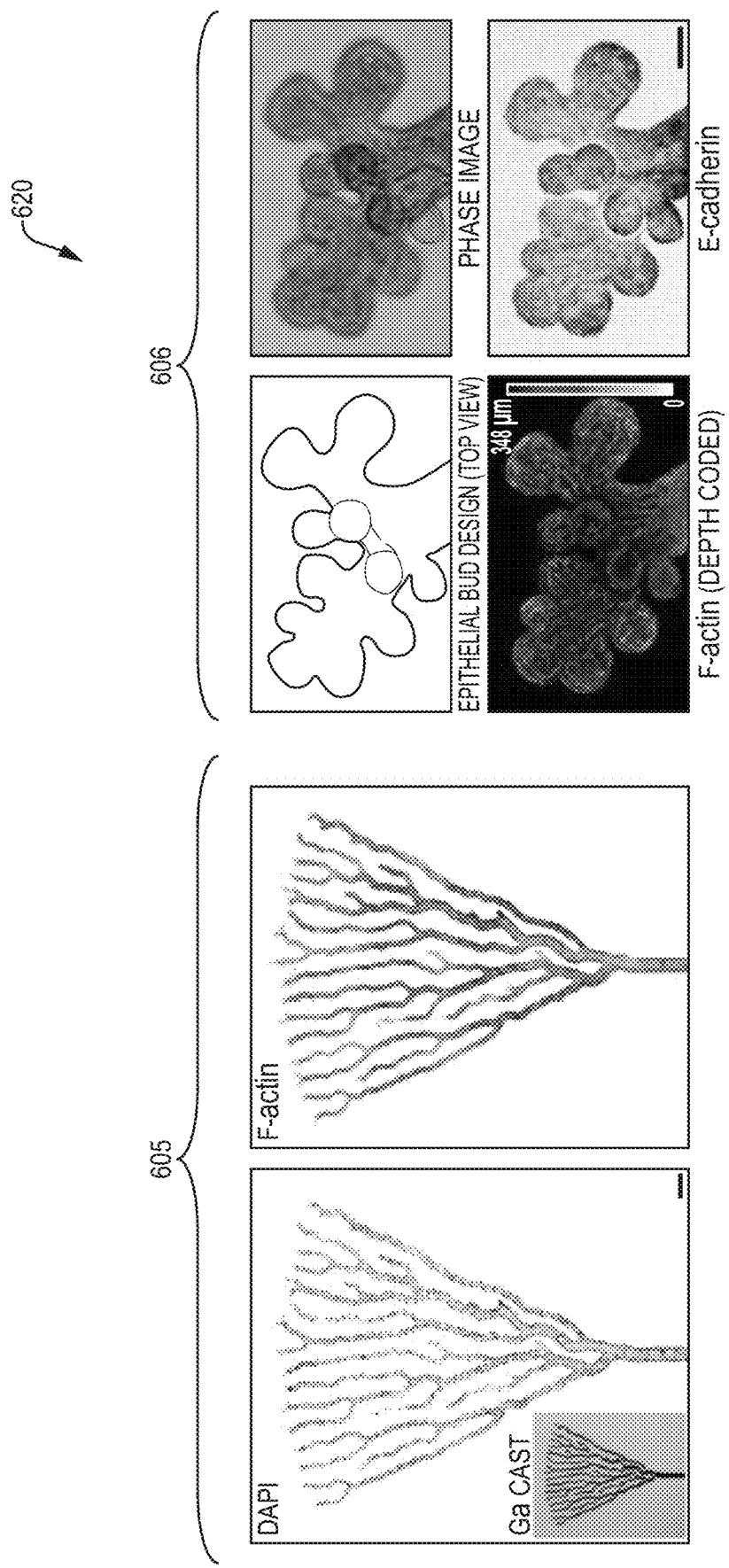

The multiscalar 3D structure of this embodiment may include any branched (ductal) tree structure, and the hollow interior of the structural material may include a hollow form of the branched (ductal) tree structure (for example, FIGS. 6A-6C). Alternatively, the multiscalar 3D structure may include a branched vessel having one or more branches obeying Murray's Law. The multiscalar 3D structure may also include a vessel having groves to control alignment of, or behavior of biological cells added to the vessel.

The liquid casting material of this embodiment may be evacuated by increasing the surface tension of the liquified casting material by removing a surface oxide of the liquified casting material by exposing the liquid cast material to an acid or a base (for example, a concentration of sodium hydroxide), by exposing the liquid casting material to an electrical current or voltage, by exposing the liquid casting material to a mechanical force, by exposing the liquid casting material to a vibration, or any combination thereof. The increasing of the surface tension of the liquified casting material causes a Laplacian pressure difference in the liquified casting material. Next, the liquid casting material is extracted from the structural material by using capillary forces that are dependent on the Laplacian pressure difference.

According to embodiments, gallium proves to be an ideal templating material for replicating multiscalar biological structures into natural extracellular matrices (ECMs) due to the following reasons: (1) its melting point (approximately 29.8° C.) closely aligns with cell culture temperatures, allowing its utilization both as a robust solid casting material and a low viscosity liquid [21-22] for demolding in the presence of natural ECMs, and (2) its tunable surface oxide [23] facilitates the use of capillary forces in the demolding process. The latter provides spatial control and the capability to evacuate complex features hierarchically (as Laplacian pressure inversely correlates with feature size). The amphoteric nature of gallium's surface oxide makes it susceptible to removal by both acids and bases. However, the high concentrations used (~1M HCl (Hydrogen Chloride) or 1M NaOH (Sodium Hydroxide)) [24] typically result in rapid degradation of natural ECMs. Guided by the Pourbaix chart of the gallium-water system [25], embodiments demonstrate that milder bases can gradually remove the surface oxide without adversely affecting natural ECMs. This approach enables controlled capillary pumping of liquid gallium in water-based environments, including hydrogels.

Figures 4A, 4B:
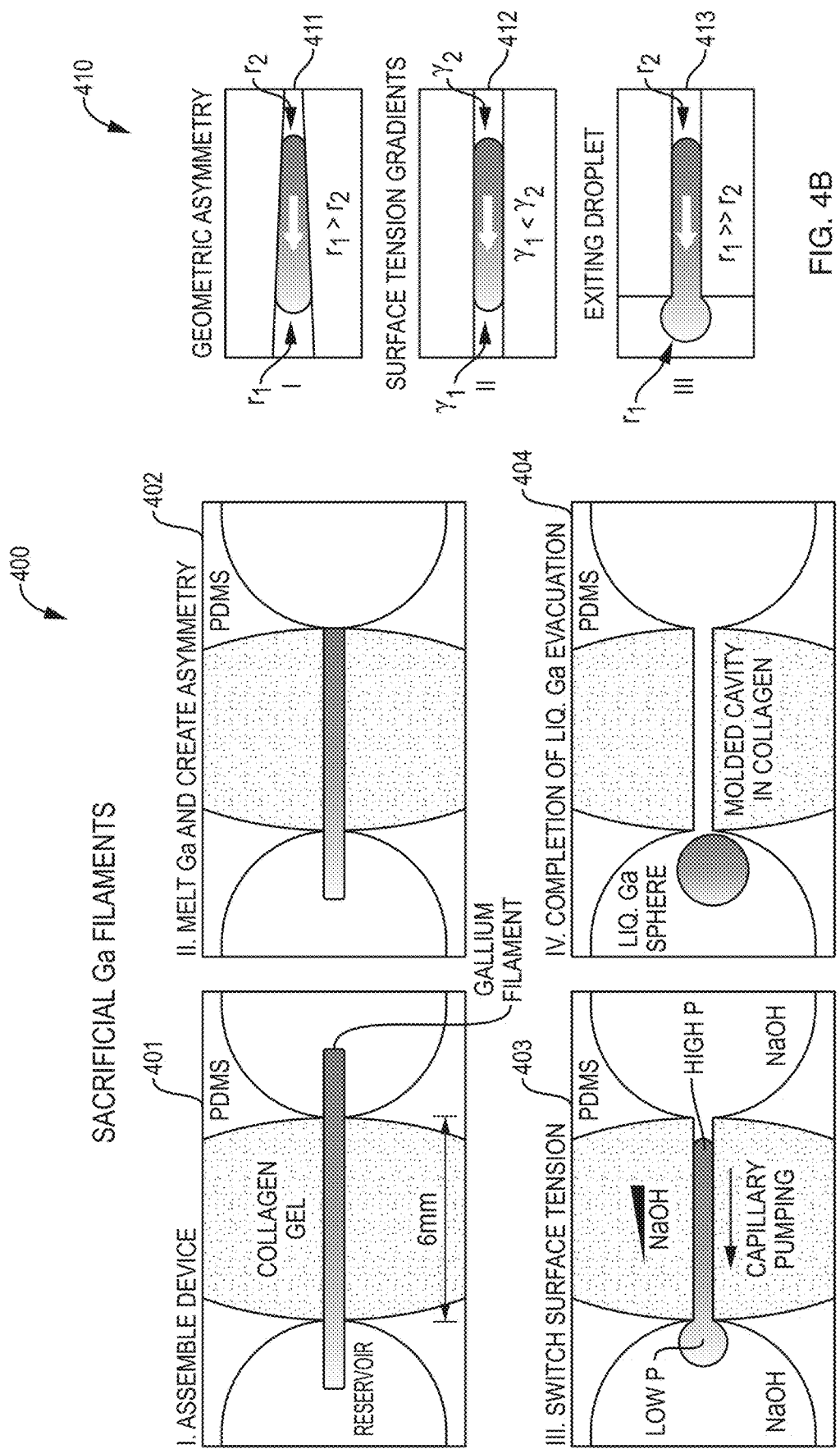
FIG. 4A illustrates a process where assembled gallium filaments are inserted into a PDMS device after which collagen is added and polymerized in central gel region surrounding the filament, according to an embodiment.
FIG. 4B illustrates example mechanisms and/or conditions for capillary pumping.

FIGS. 4A-4B illustrates a process 400 where assembled gallium filaments 401 (150 μm diameter) are inserted into a PDMS device after which collagen is added and polymerized in central gel region surrounding the filament, according to an embodiment. Two open reservoirs offer direct access to the gallium filament. The temperature is subsequently increased 402 to melt gallium and sever one of the exposed sections of the liquid filament (right reservoir in schematic) to create a geometric asymmetry. When the surface tension is raised 403 by removing the native surface oxide of gallium, the liquid plug evacuates 404 to the side with the larger exposed gallium section (due to its lower Laplace pressure), eventually forming a fully evacuated sphere.

FIG. 4B shows a method 410 illustrating example mechanisms and/or conditions for capillary pumping, according to embodiments. The Laplacian pressure across an interface is determined by the surface tension ($\gamma$) and the principal curvatures ($r^{-1}$). When a high surface tension droplet is physically constrained (with contact angle ~180°), the resulting differences in capillary forces can result in directional flows. In the presence of geometric asymmetries 411, e.g., with narrowing towards one direction, capillary pumps force liquids against this narrowing. Surface tension gradients 412 can result in this effect directly even in the absence of any geometric variations. When a liquid droplet exits an opening 413, the lower curvature at the exiting end of the droplet forces it to evacuate completely.

Embodiments include assembled gallium (Ga) filaments (150 μm diameter) to span across 6 mm-wide chambers and polymerized collagen around the filaments (400). Upon melting the filament and removing its surface oxide with NaOH which creates a state of high interfacial tension, an asymmetry in geometry between the two ends of the filament induces a Laplacian pressure difference, leading to unidirectional capillary flow. When exposed to NaOH concentrations of 100 mM or 50 mM, liquid gallium swiftly withdraws from the gel, sometimes resulting in inconsistent evacuation and fragmentation of the liquid plug into multiple pieces due to an abrupt change in surface tension. In contrast, with 20 mM and 10 mM NaOH, the gradual surface oxide removal ensures a consistent and uninterrupted evacuation of liquid gallium, forming a conduit through the collagen gel, visualized with colored beads. (FIG. 7E, 705) The dimensional stability of collagen may be evaluated through second harmonic generation (SHG) imaging of preformed collagen cavities exposed to different NaOH concentrations. Sharp boundaries and overall dimensional accuracy were maintained after a 30-minute exposure to NaOH at concentrations of 20 mM and below. However, at 50 mM NaOH, substantial dimensional changes and blurring of edges may be observed, and at 100 mM NaOH, the gel boundaries may no longer be clearly identifiable. Additionally, SHG imaging of bulk collagen gels may reveal that collagen may not be substantially altered in terms of the architecture and intensity at NaOH concentrations up to 20 mM (30-minute exposure) but may be affected at 50 mM and above. Considering these findings, further experiments employed 10 mM or 20 mM NaOH.

The theoretical considerations for efficient unidirectional capillary pumping of liquid gallium (FIG. 4B) are herein described. Pure gallium, devoid of its native oxide, displays an approximate ~180° contact angle in water-based environments owing to its high surface tension [26] (~708 mN/m). The local Laplace pressure at the gallium-water interface is calculated as $2\gamma/r$ where $\gamma$ represents the interfacial tension, and r is the principal radius of curvature. Laplace pressure differentials arise from geometric asymmetries [27] (FIG. 4B, 411), surface tension gradients (FIG. 4B, 412) or the exit of a droplet from a constricted region (FIG. 4B, 413). Liquid plugs in 411 and 412 undergo unidirectional flow when confined by rigid walls counteracting the forces exerted by gallium. However, when surrounded by soft gels, the internal pressure of gallium can prevail and allow it to form a spherical droplet that then deforms the surrounding gel. This is termed as elastocapillarity [28-29], and eventually leads to gallium entrapping itself. To effectively maintain rigidity and prevent entrapment, the elastic modulus of the surrounding material must exceed $3\gamma/r$. Natural ECMs fall below this threshold for values of r less than the capillary length of Ga. Thus, for reliable gallium evacuation, it may be beneficial to sustain the lowest Laplacian pressure outside the structure being evacuated (FIG. 4B, 413). This practically is achieved by incorporating a bulb of gallium at the collecting end of the mold.

The ESCAPE molding process for forming 3D structures in ECMs is illustrated in FIG. 1A, demonstrated using the Stanford Bunny as an illustrative example. Initially, the desired structure is designed and printed (FIG. 1A, 101) and a negative copy is created using a soft elastomer (FIG. 1A, 102). A commercial two-photon direct write system may be employed to form the mold structure, and polydimethylsiloxane (PDMS) is applied and crosslinked around the mold to form the negative structure; it is noteworthy that the process is adaptable to various fabrication methods for building the mold and negative structure. Liquid gallium is introduced and solidified within the cavity, after which it is removed (or selectively etched) to generate the cast (FIG. 1A, 103). The gallium cast is then assembled into a device and the desired soft material is polymerized around it (FIG. 1A, 104). Finally, gallium is liquified and evacuated using capillary forces (FIG. 1A, 105). The empty cavity may be used as a 3D cell culture substrate wherein human endothelial cells (ECs) were seeded to form a confluent lining to illustrate the final biological form of interest. Depth-coded projections of the cell nuclei are in FIG. 1B. To evaluate patterning fidelity, the collagen cavity (before cell seeding) may be compared with the original design, and it may be observed that fine features such as the ear tips (~50 μm) and the overall 3D body shape (~1 mm) were well replicated in the collagen gel.

Figure 5D:
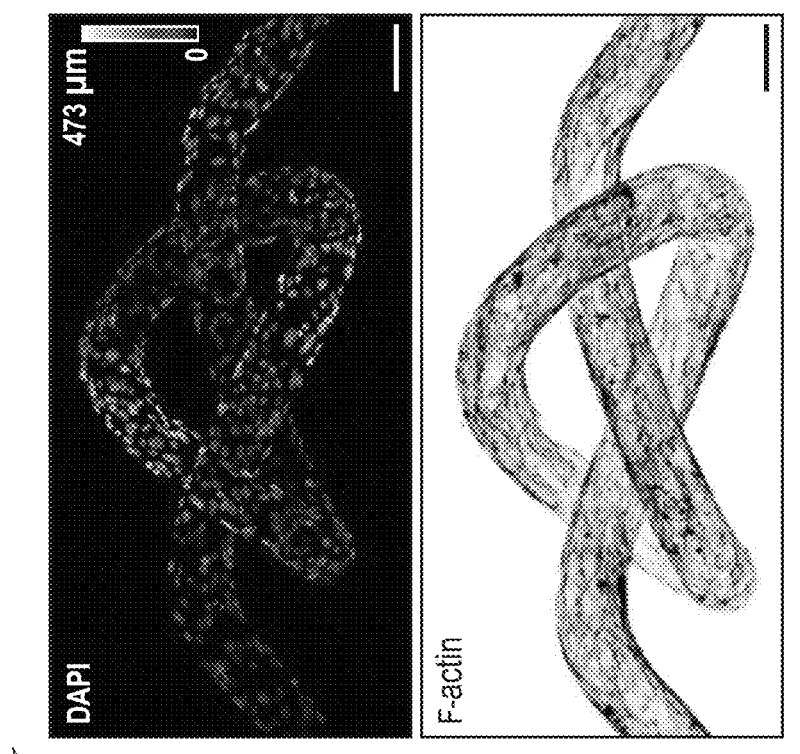
Figure 5C:
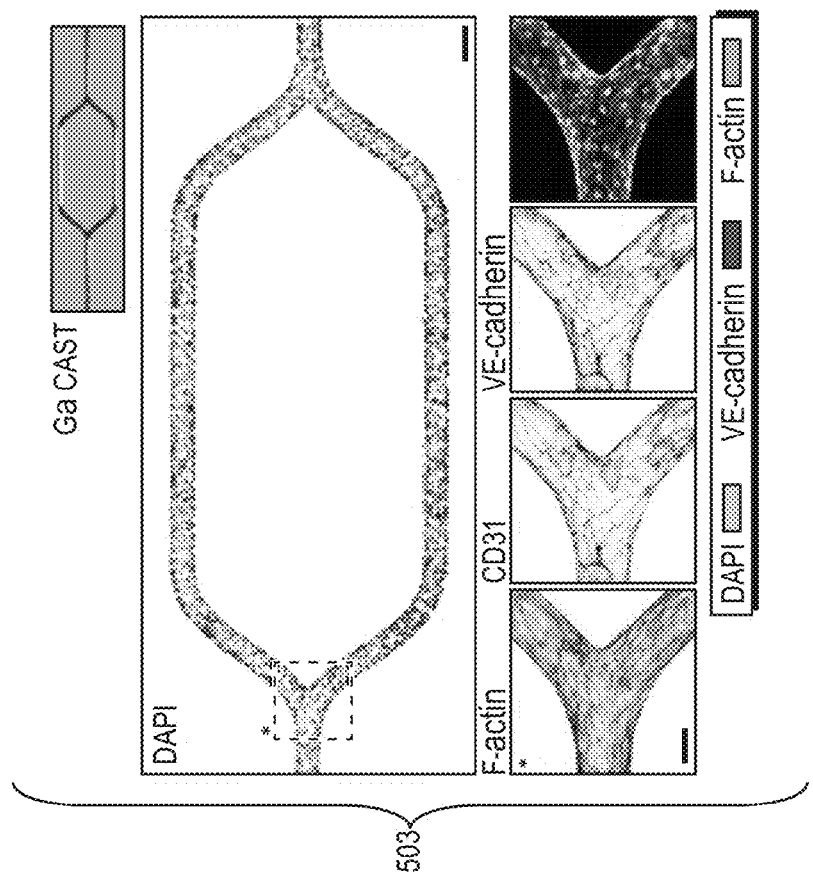
Figures 5E, 5F:
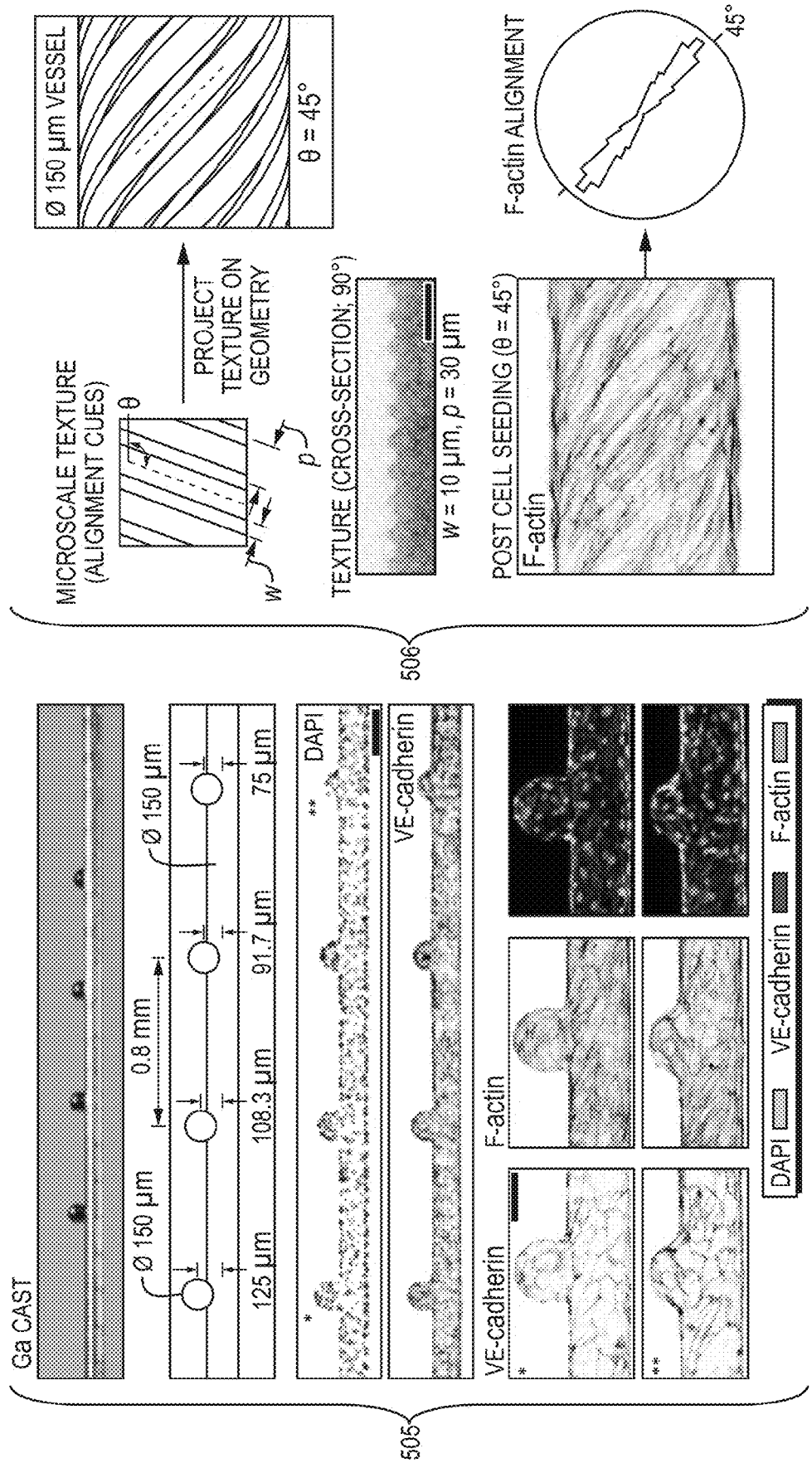

FIGS. 5A-5F illustrate various endothelialized structures, vessel topologies, and fine features, according to embodiments. FIG. 5A illustrates a 60 μm cylindrical vessel (scale bar 50 μm) 501. FIG. 4B depicts a sinusoidal vessel (scale bar 200 μm) 502. Close-ups of FIG. 5B show the curved and linear regions (scale bar 50 μm). FIG. 5C depicts a 150 μm vessel 503 that bifurcates into two equally sized daughter vessels (scale bar 200 μm); zoomed in sections of FIG. 5C show the branching junction (scale bar 100 μm). FIG. 5D depicts geometries such as an overhand knot 504 (100 μm diameter) that can be realized with the gallium ESCAPE molding approach (scale bar 100 μm). FIG. 5E depicts vascular malformations 505 consisting of spherical blebs offset from the cylindrical vessel (full device scale bar 200 μm; close-up projections scale bar 100 μm). FIG. 5F depicts microscale textures 506 to orient endothelial cells that can be projected on the blood vessel designs to control cell alignment in addition to the overall vessel geometry. Enlarged images of FIG. 5F show the cross section of the texture (scale bar 50 μm) and a section of the vessel with grooves oriented at θ=45°.

FIGS. 6A-6C represent embodiments 600, 610, and 620 illustrating hierarchical vascular trees and epithelial ducts. FIG. 6A shows embodiment 600 illustrating a hierarchical branching architecture 601 with diameters spanning an order of magnitude (scale bar 200 μm). FIG. 6A also illustrates a tile scan 602 of a binary branching tree where each vessel is subjected to flow (i.e., the design has no dead ends). Inset: Gallium cast. The closeup images of 602 show branching junctions at two hierarchical levels.

FIG. 6B shows embodiment 610 depicting a computationally generated square tree 603 covers a 4 mm×4 mm area. Each terminal branch of the tree is set to be a 50 μm-sized (dead-ended) vessel. All higher hierarchical branches are sized according to Murray's Law resulting in an inlet diameter of 231.3 μm. The tree may be grown using computational algorithms (e.g., space colonization algorithm). The lower portion of 603 shows the gallium cast. FIG. 6B also shows a tile scan 604 of the cell nuclei after cell seeding (scale bar 250 μm). The closeup images show portions of device where dead-ended sections come near each other and other regions of branching (scale bar 100 μm).

FIG. 6C shows embodiment 620 including a tile scan 605 of a marginal growth tree (cell nuclei and F-actin) designed to fit a sector of a circle, with aligned vessels (scale bar 250 μm). Inset shows the gallium cast. The ESCAPE process 606 can be expanded to non-vascular geometries such as epithelial ducts. The images of 606 show the original design of the 3D epithelial duct, phase contrast image post epithelial cell culture, depth-coded F-actin image and the maximum projection of the E-cadherin stain. Scale bar 100 μm.

Figure 7A:
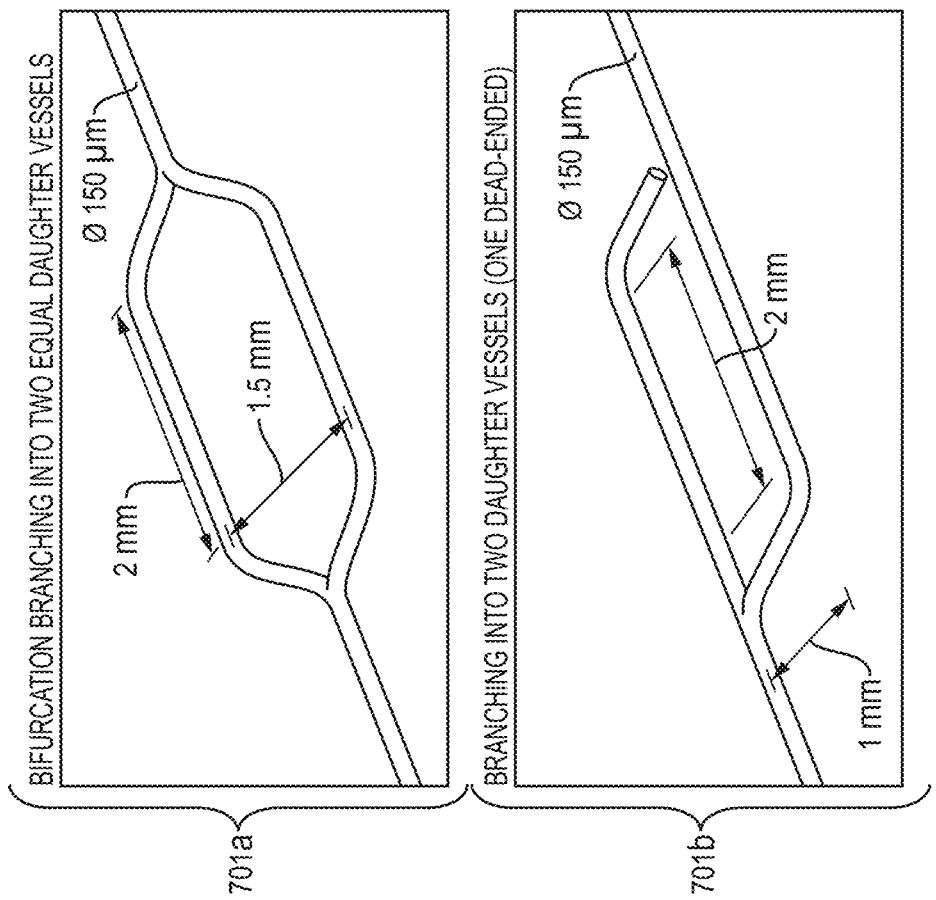
FIGS. 7A-7E illustrate capillary pumping (Gallium ESCAPE) in different materials.
Figure 7B:
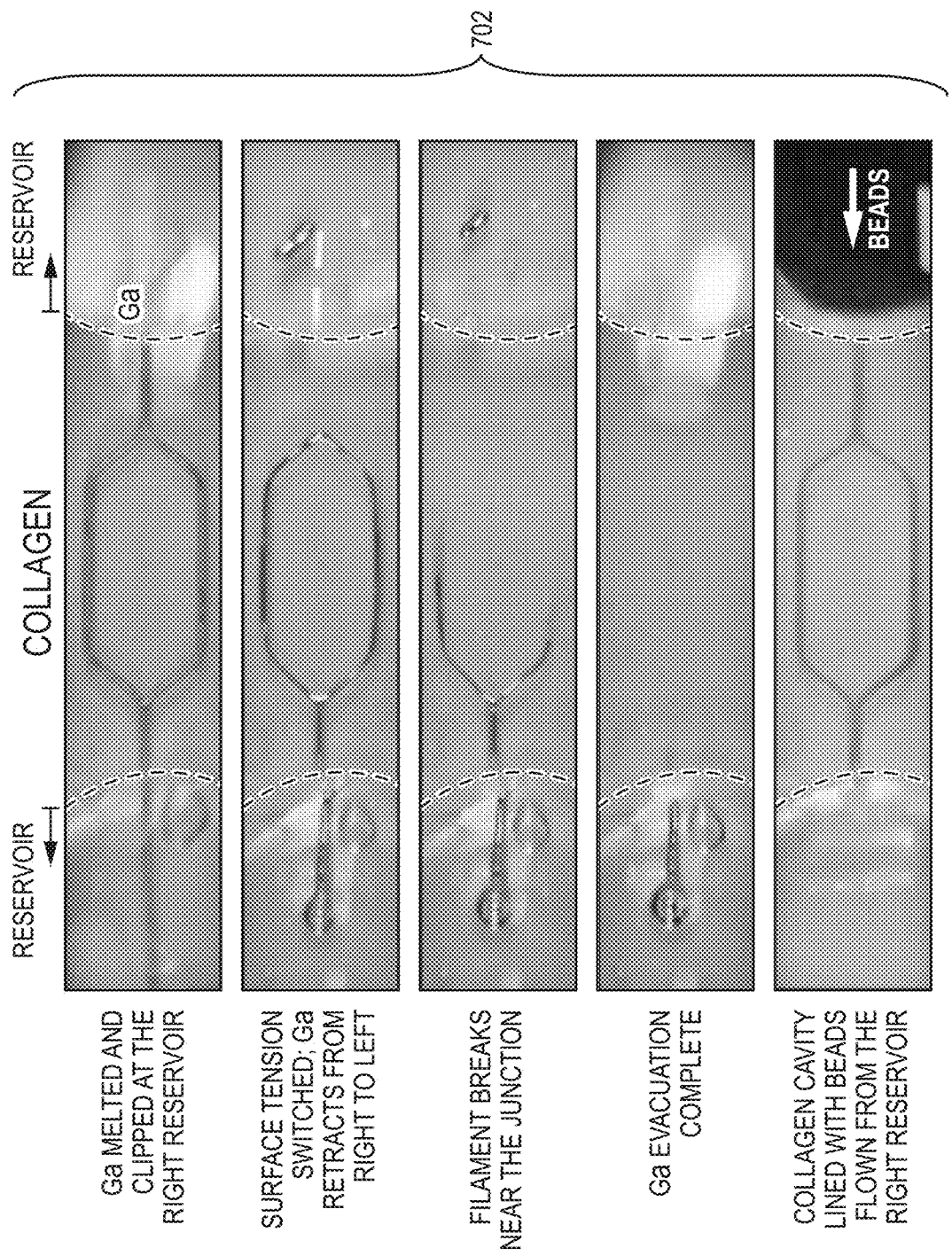

FIGS. 7A-7E illustrate capillary pumping (Gallium ESCAPE) in different materials. FIG. 7A illustrates embodiment showing capillary pumping in a bifurcating vessel. Top image 701a of FIG. 7A illustrates design of bifurcations for making gallium casts, where the bifurcation branches into two equal daughter vessels. Bottom image 701b of FIG. 7A illustrates design of bifurcations for making gallium casts, where the bifurcation branches into two daughter vessels with one being a dead end. FIG. 7B shows progressive images 702 depicting how gallium can be evacuated in soft materials such as collagen. Upon removing the gallium cast, the empty cavity can be filled with cells or other materials; here the branching conduits is filled with beads for visualization.

Figure 7C:
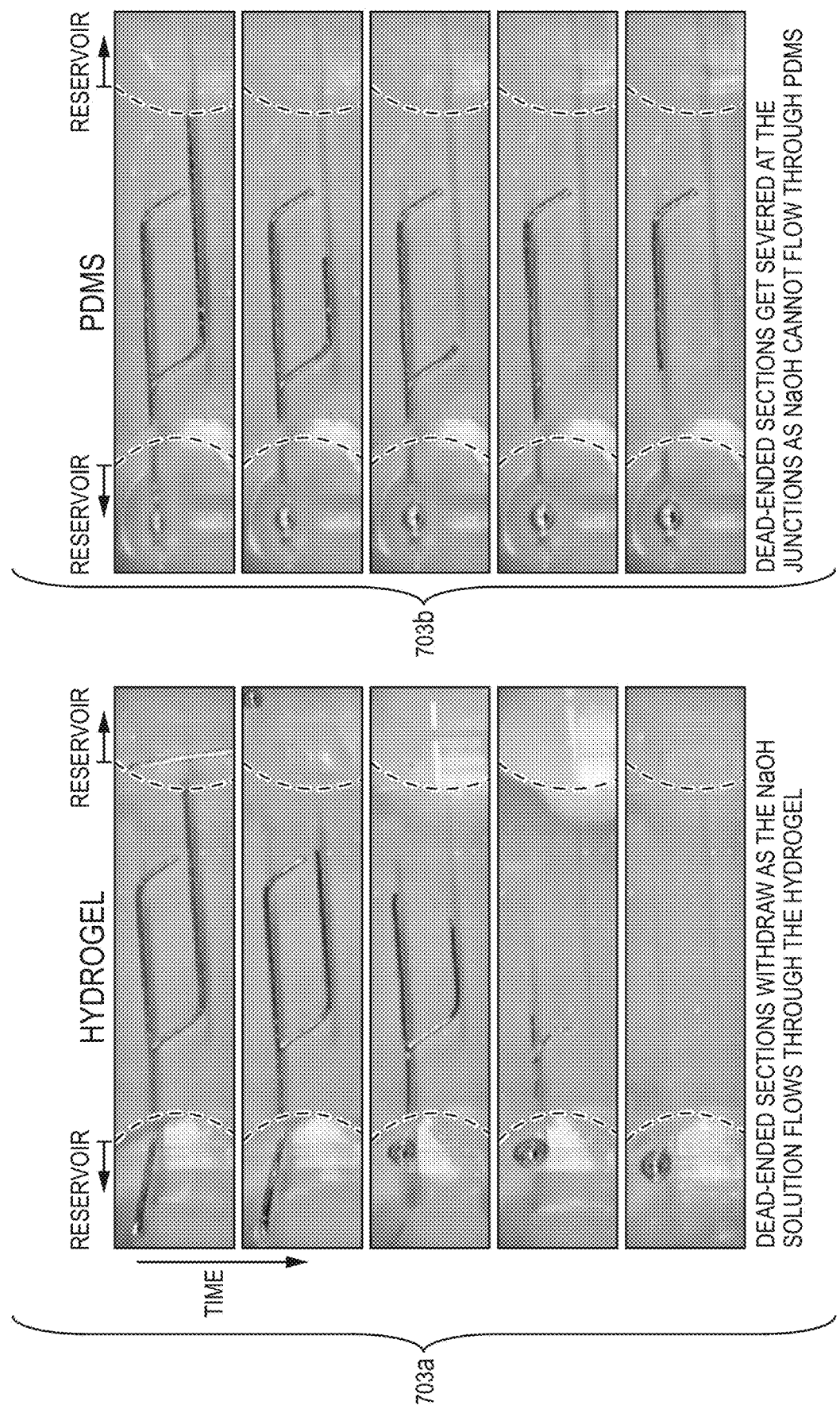

FIG. 7C illustrates geometries 703a-b with both flow-accessible conduits and dead ends can be retracted at once. In some embodiments, this differs from using gallium as a sacrificial material with non-porous surrounding materials (e.g., PDMS) without interstitial flow where dead-ended branches are severed during evacuation. As shown in 703a, dead ended sections withdraw as the NaOH solution flows through the hydrogel. As shown in 703b, dead ended sections get severed at the junctions as NaOH cannot flow through PDMS.

Figures 7D, 7E:
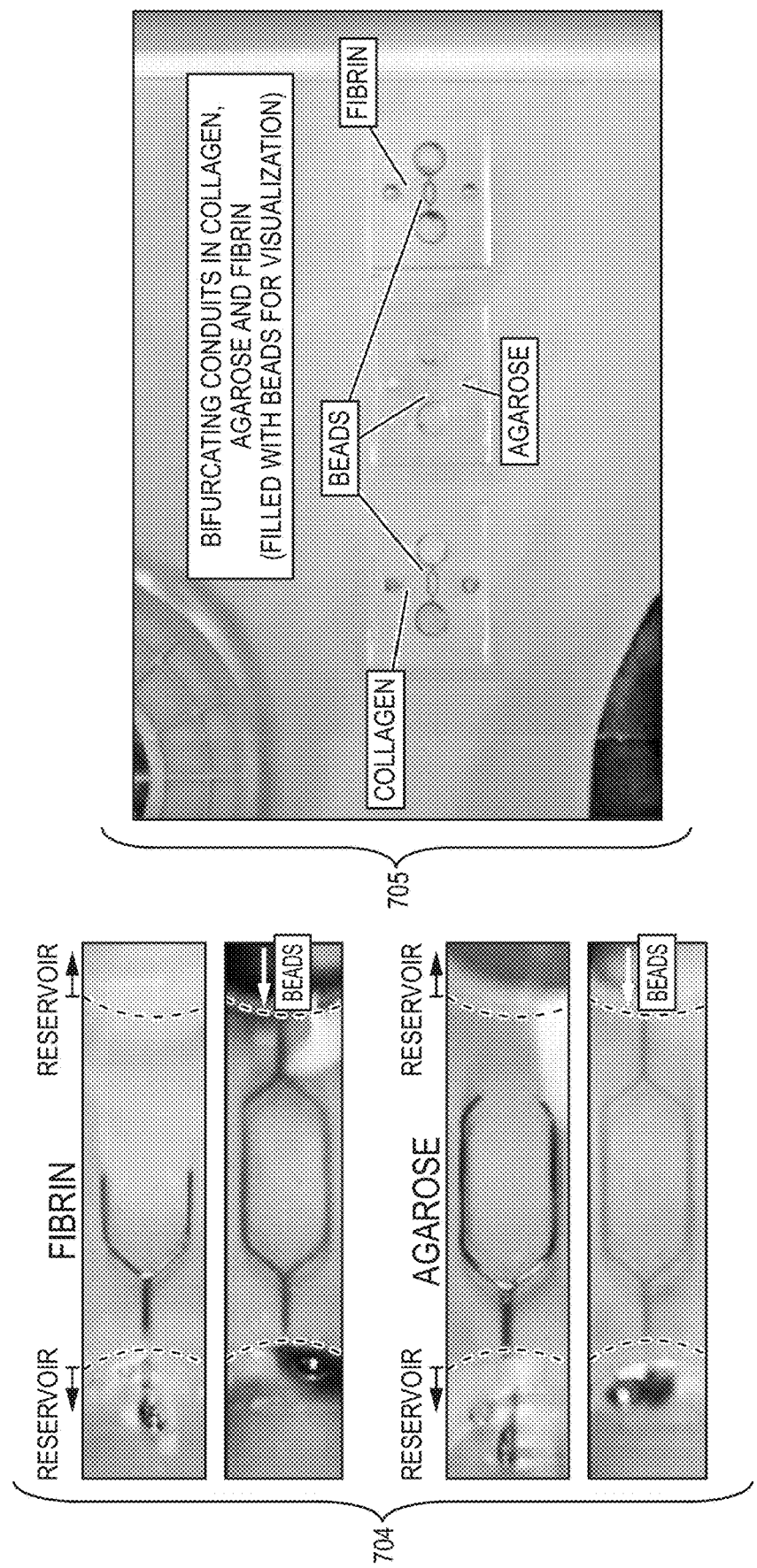

FIG. 7D illustrates how the retraction process 704 works in other soft hydrogels like fibrin (FIG. 7D, top) or agarose (FIG. 7D, bottom).

FIG. 7E shows a photograph 705 of devices with different materials, such as collagen, agarose, and fibrin, upon gallium retraction with beads lining the conduits.

Figure 8B:
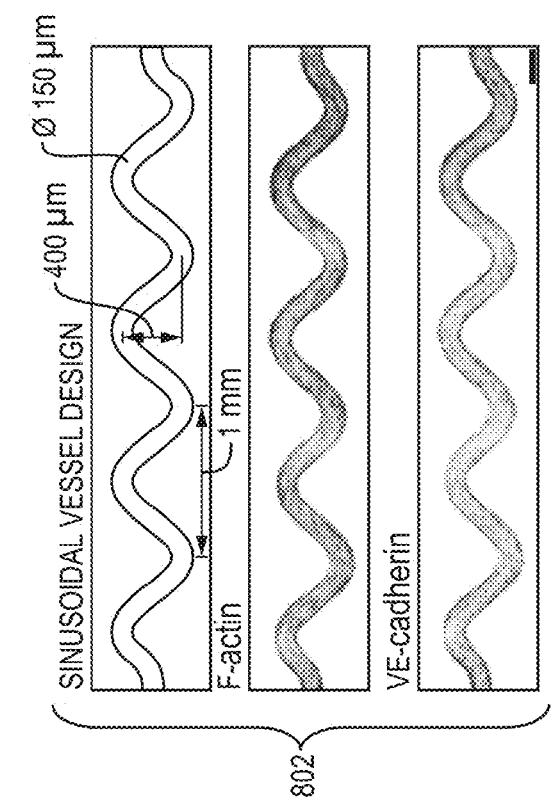
Figure 8A:
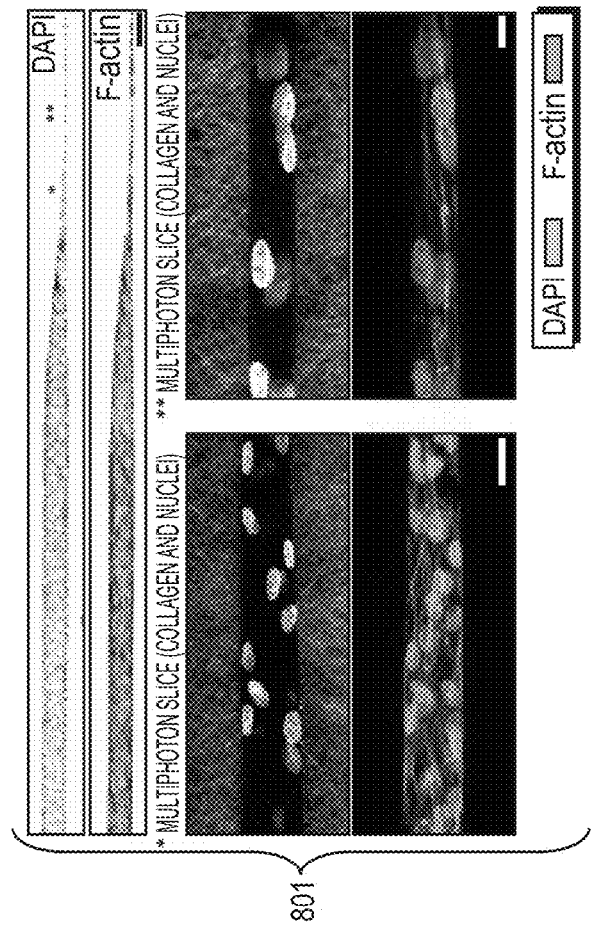

FIGS. 8A-8I illustrate embodiments depicting endothelialized vessels. FIG. 8A shows embodiment 801 depicting a tapered vessel with caliber decreasing from 150 μm to 20 μm (scale bar 200 μm). Close-up multiphoton images on the lower portion of FIG. 8A show collagen and the cell nuclei in a single plane. Corresponding confocal maximum projections show that cells line the vessels uniformly until the cavity is comparable in size to the cell nuclei (scale bars: left 25 μm, right 10 μm). FIG. 8B shows embodiment 802 depicting a sinusoidal vessel design and fabricated device (scale bar 200 μm). FIG. 8C shows embodiment 803 depicting a bifurcating vessel with one dead-ended branch and maximum projections of the fabricated device, while FIG. 8D shows the tile scan 804; scale bar 200 μm. The close-up images of FIG. 8C show the perfused and the dead-ended sections.

Figure 8G:
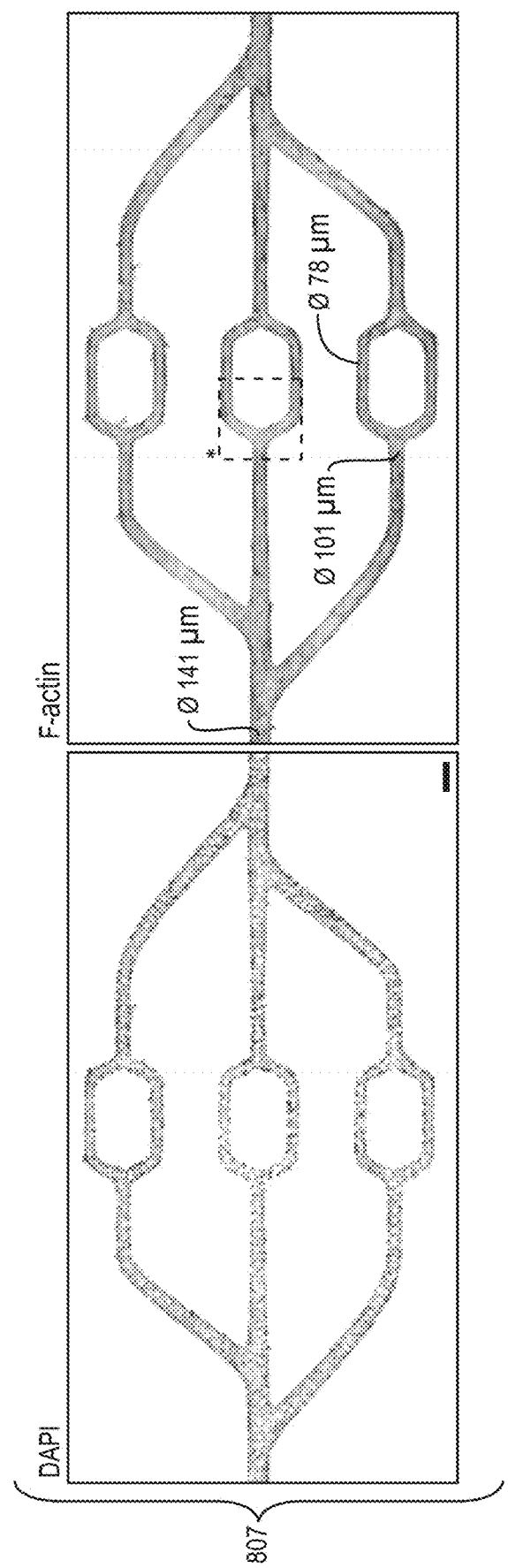

FIG. 8E shows embodiment 805 depicting a two-level branching Murray design (scale bar 200 μm). FIG. 8F shows the gallium cast 806 of the two-level branching Murray design from FIG. 8E, while FIG. 8G shows illustrates immunofluorescence images 807 of the gallium cast 806. FIG. 8H illustrates the two-level branching design 808 with narrow constrictions in the smallest branches, and the fabricated device. FIG. 8I shows close-up images 809 (scale bar 200 μm) show four constricted sections (scale bar 50 μm), FIG. 8I also shows immunofluorescence images 810 of the structure.

Figure 9A:
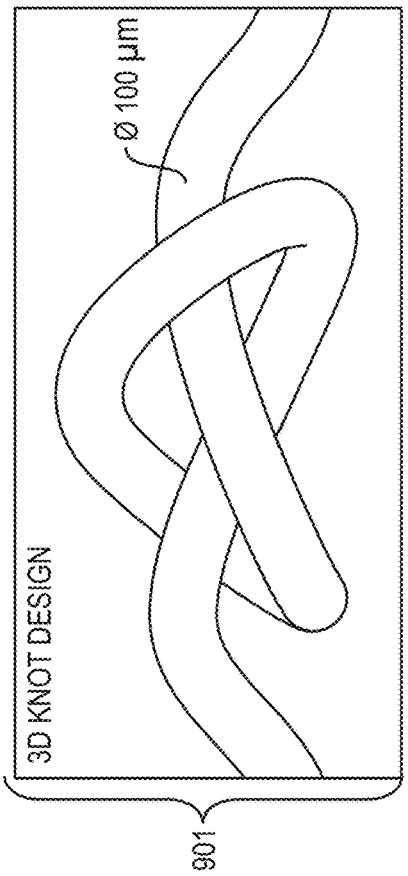
FIGS. 9A-9H illustrate forming 3D structures demonstrating closed-loop geometries.
Figure 9B:
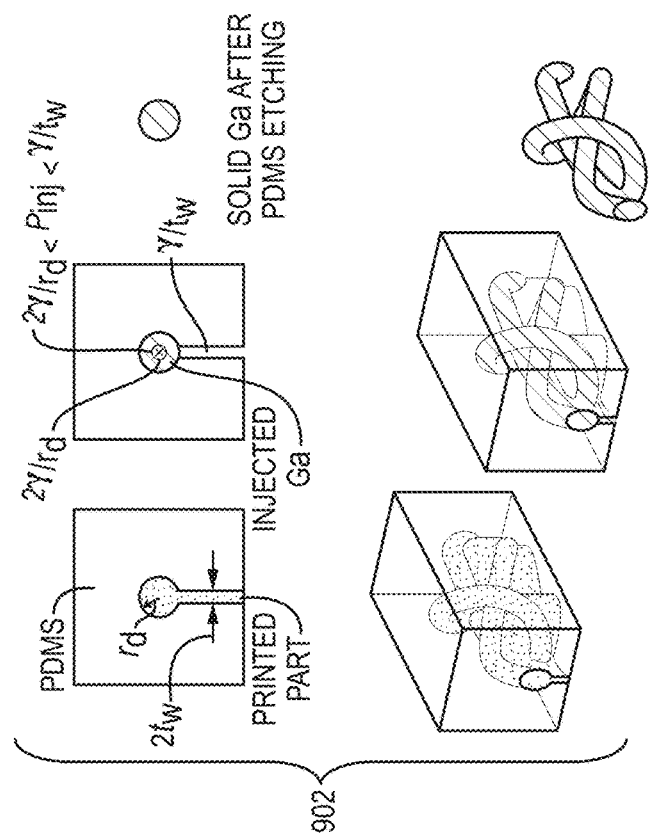
Figure 9C:
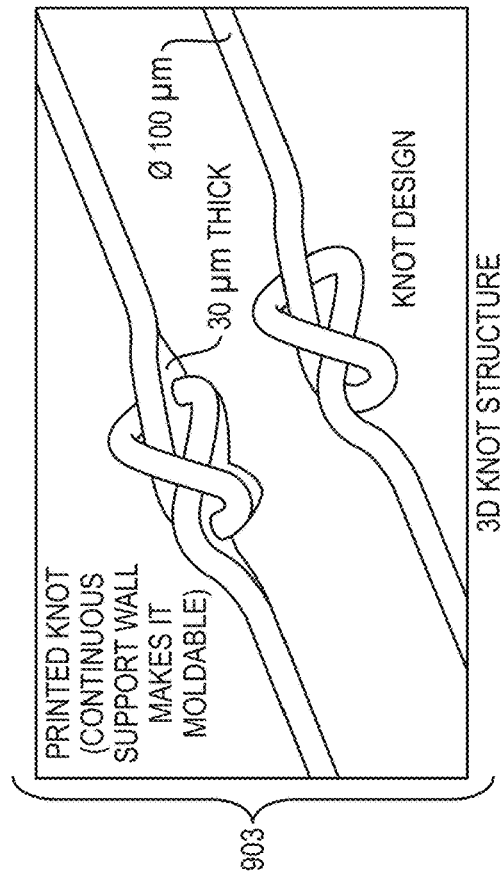
Figure 9D:
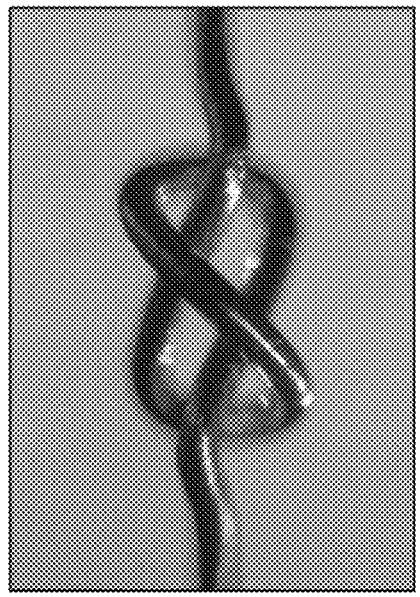
Figure 9F:
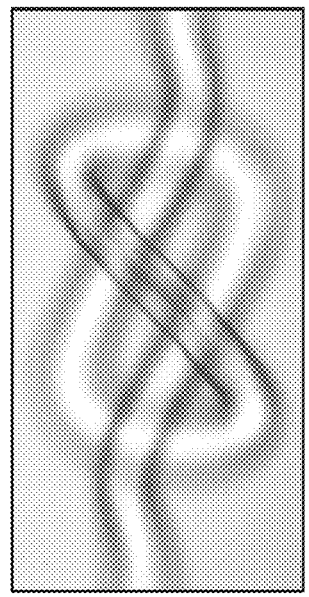
Figure 9E:
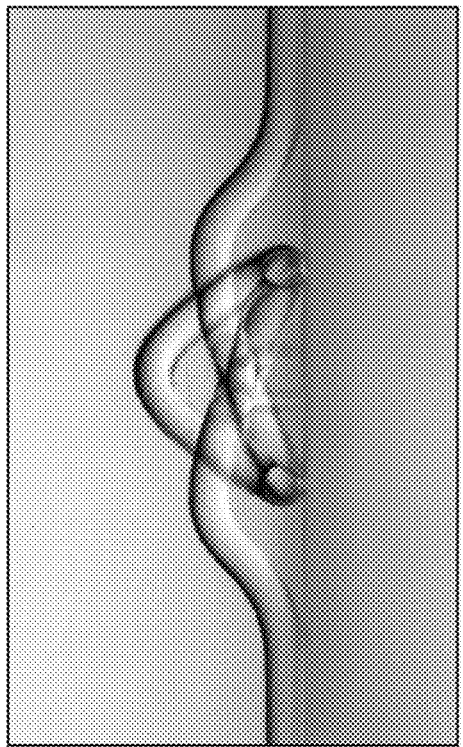
Figure 9G:
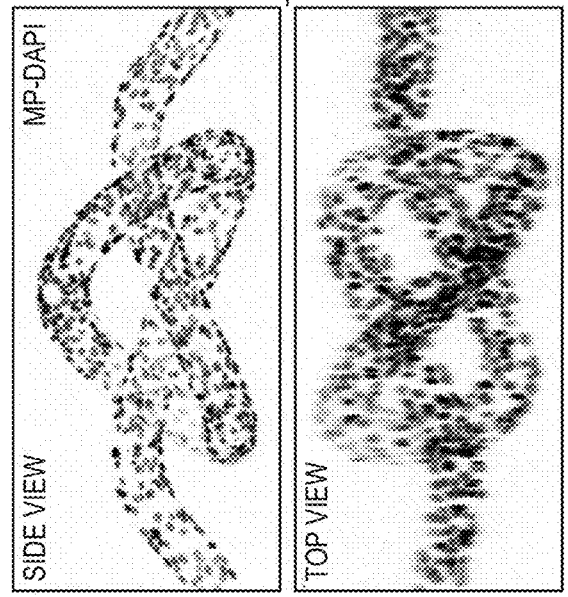
Figure 9H:
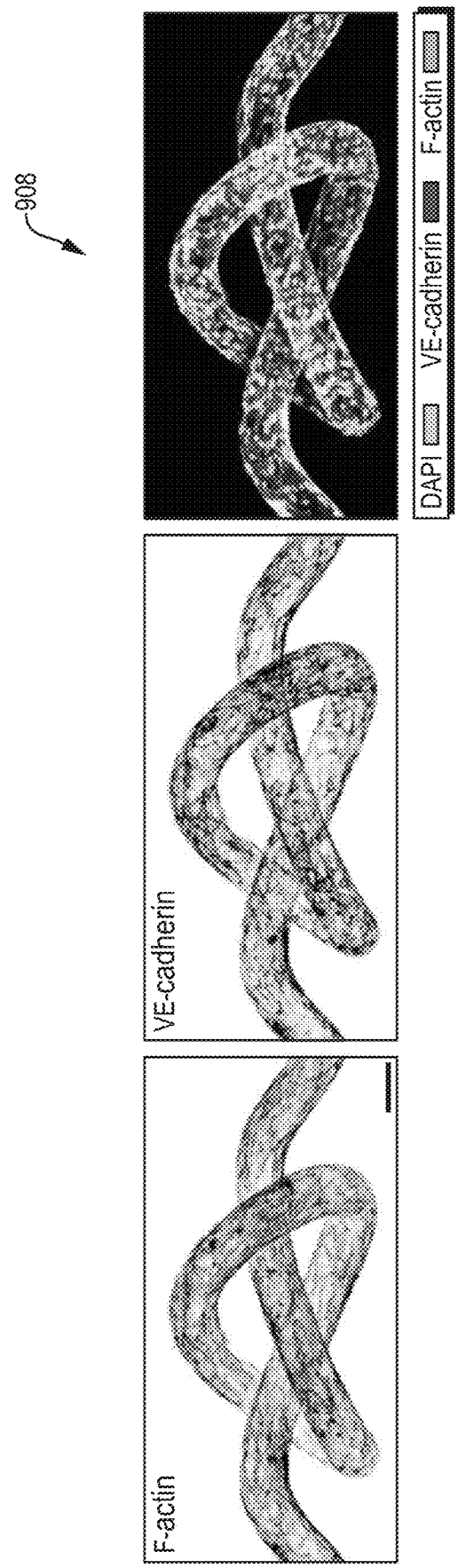

FIGS. 9A-9H illustrate forming 3D structures demonstrating closed-loop geometries. FIG. 9A illustrates an embodiment 901 depicting an overhand knot, but the same methods apply to any closed-loop geometry. By introducing a narrow continuous wall 902 (shown in FIG. 9B) under the part (i.e., the overhand knot), closed-loop geometries may be molded. The thickness of the wall is made to be much smaller than the feature. After demolding the negative structure, the high surface tension of the liquid is used in controlling where gallium flows, i.e., the injection pressure is above the value required to inject gallium into the knot itself but not sufficiently high for entering the gap left by the narrow wall. FIG. 9C shows the modified design 903 of the knot used for printing and the resulting shape of the gallium cast. FIG. 9D shows the PDMS negative copy 904 of the printed structure. FIG. 9D shows a sideview 905 of 904. FIG. 9F is a photo 906 of the molded gallium knot. FIG. 9G is a side-view and top-view 907 of the cell nuclei (scale bar 100 μm). FIG. 9H shows immunofluorescence images 908 of the endothelial cell lined knot labelling F-actin and VE-cadherin (scale bar 100 μm).

Figure 10A:
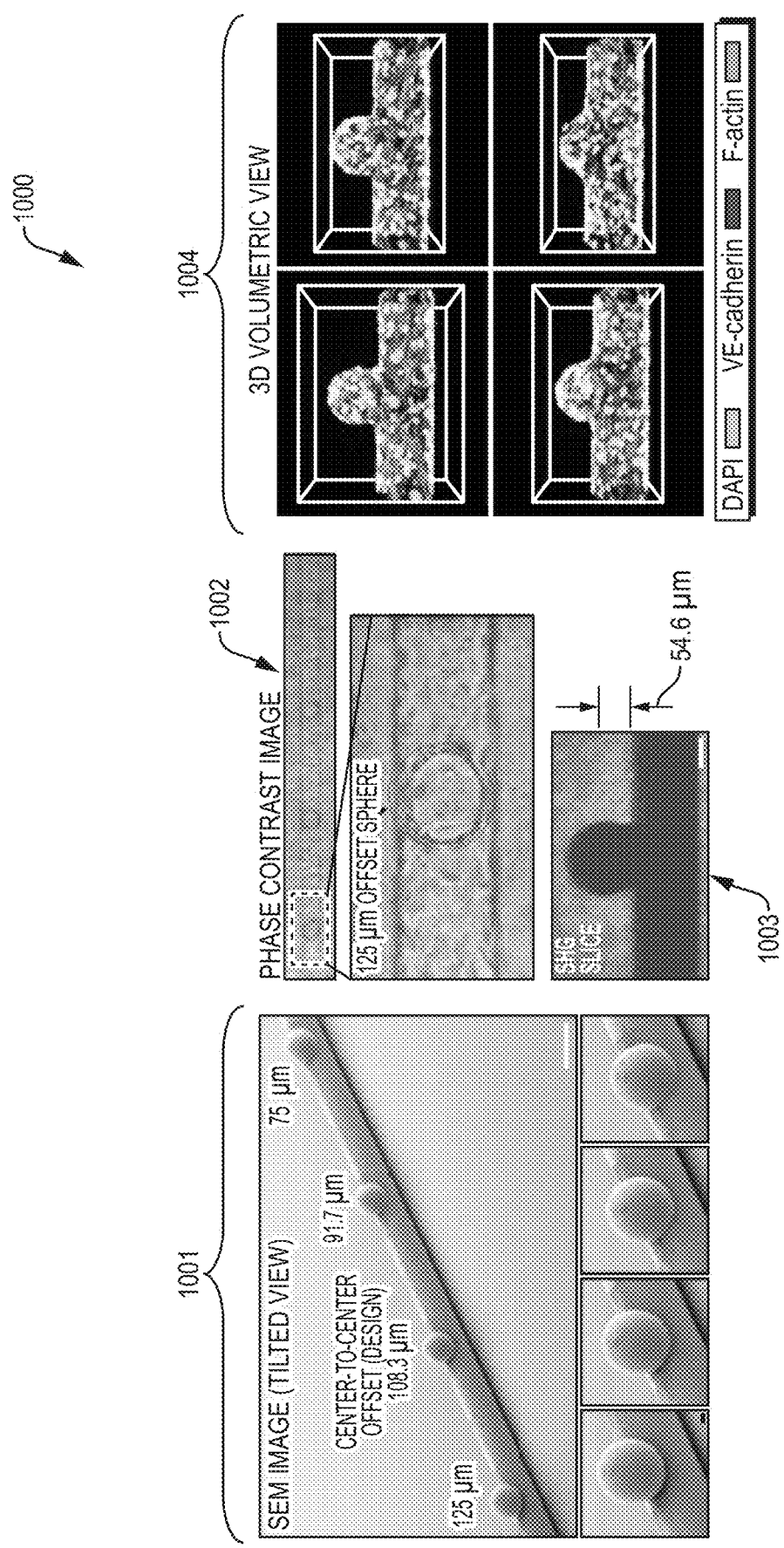
FIGS. 10A-10C illustrate forming a 3D structure demonstrating fine control of vascular structures as well as vascular malformations and microgrooves to control a cell alignment.
Figure 10B:
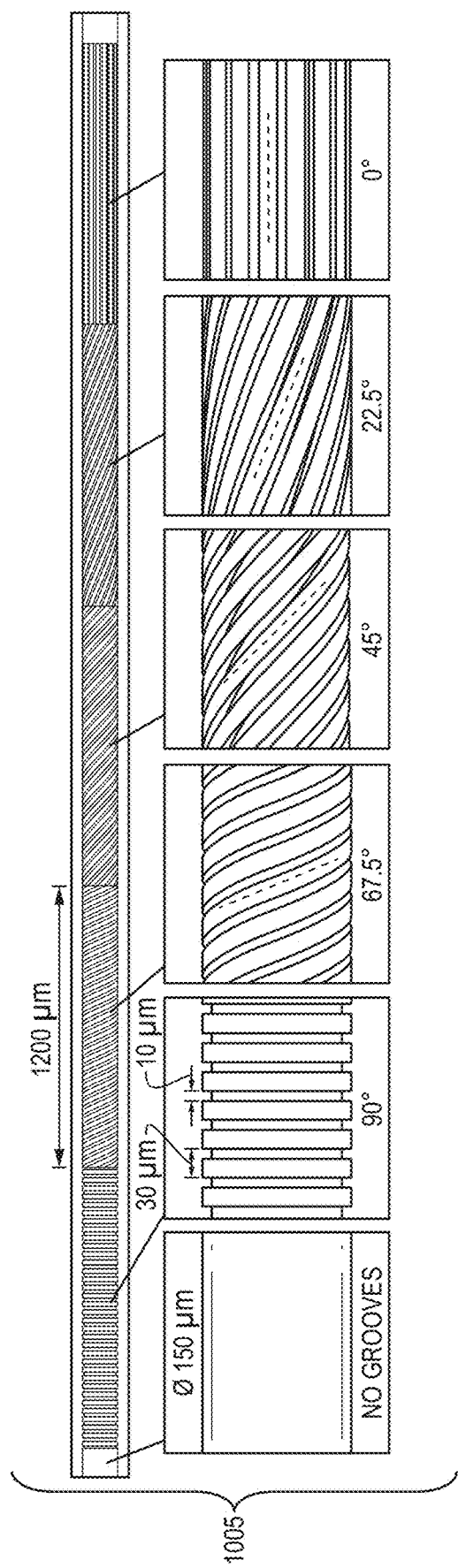
Figure 10C:
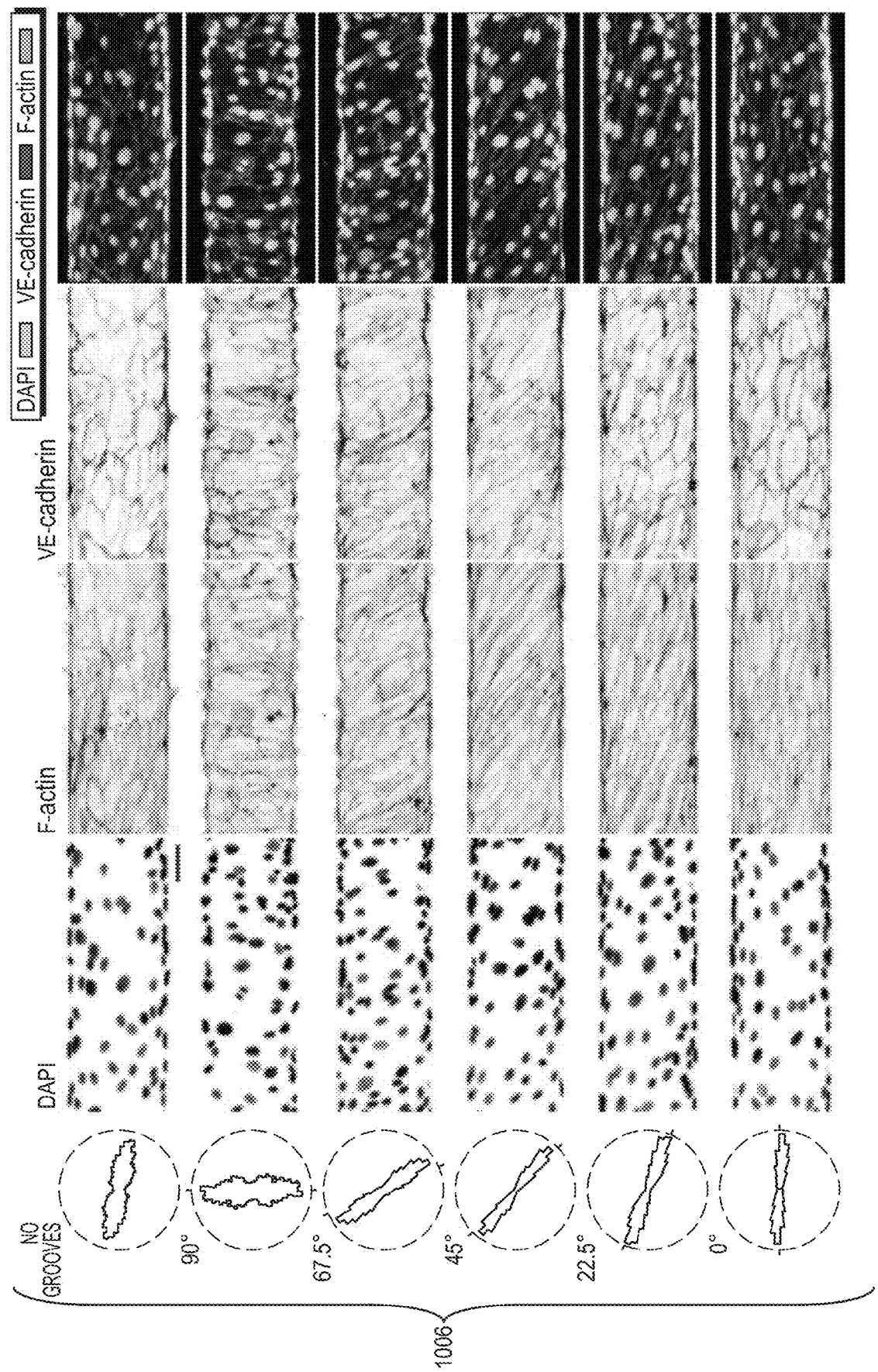

FIGS. 10A-10C illustrate an embodiment 1000 demonstrating fine control of vascular structures as well as vascular malformations and microgrooves to control a cell alignment. FIG. 10A shows tilted angle SEM images 1001 of the printed vascular malformation design (scale bar 200 μm). Close-up images show spherical blebs with different offsets (scale bar 20 μm). FIG. 10A also shows a phase contrast image 1002 of the collagen device seen from top of the blebs. The fabrication process yields high resolution, smooth spherical blebs (shown by the arrow). FIG. 10A shows a SHG slice 1003 of collagen (averaged) through one bleb structure prior to cell seeding (scale bar 50 μm), while 1004 shows 3D volumetric views of the different spherical blebs.

FIG. 10B shows a design 1005 of a cylindrical vessel with no orientation cues and five regions to align cells progressively from 90° to 0° (along the length of the vessel). FIG. 10C shows orientation histograms 1006 of the cells from FIG. 10B (F-actin) at different regions of the vessel. The half vessel maximum projections of DAPI, F-actin and VE-cadherin at different vessel regions (scale bar 50 μm).

Figure 11A:
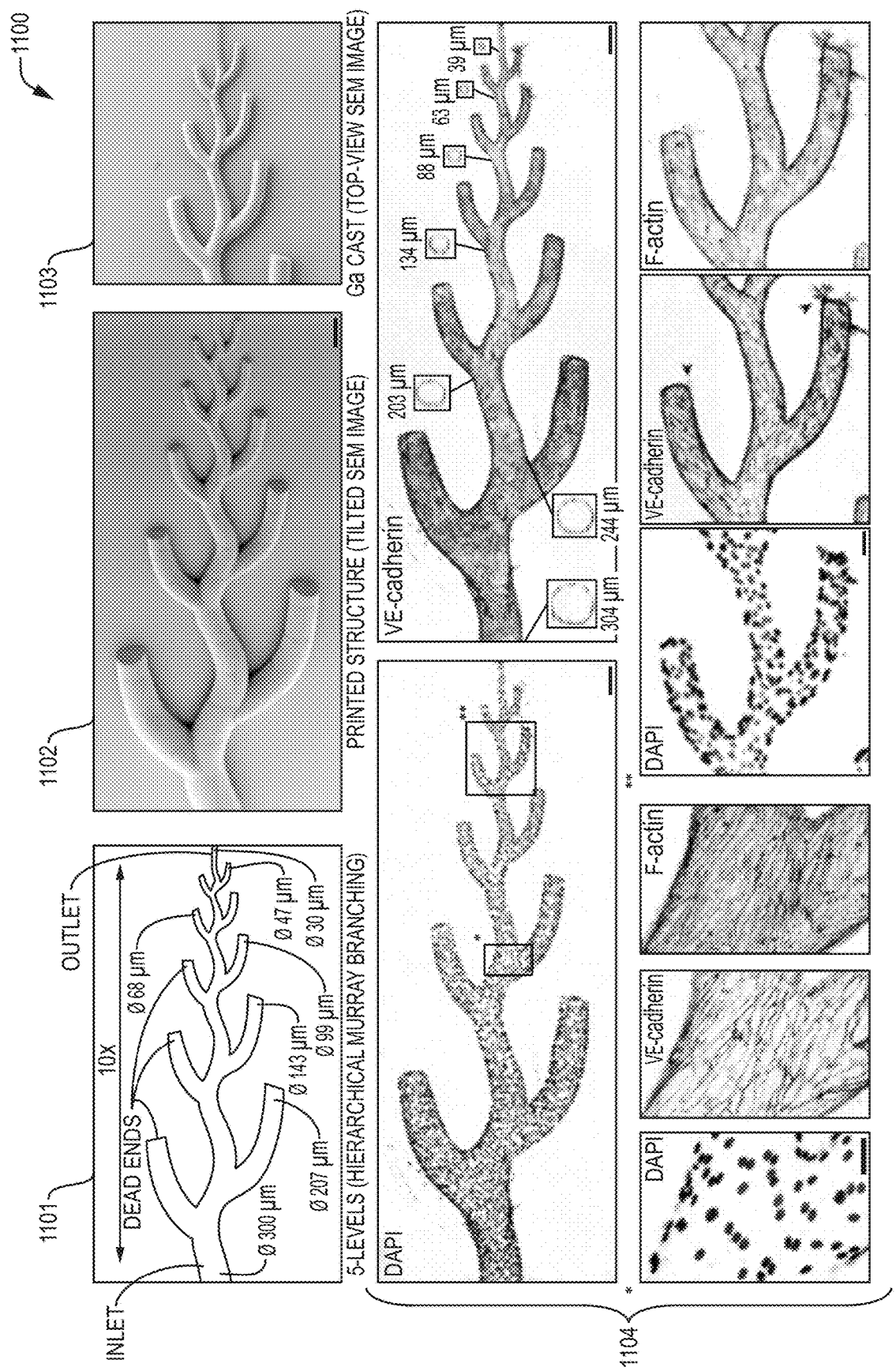
FIGS. 11A-11B illustrate hierarchical branching trees with both perfused and dead-ended sections.
Figure 11B:
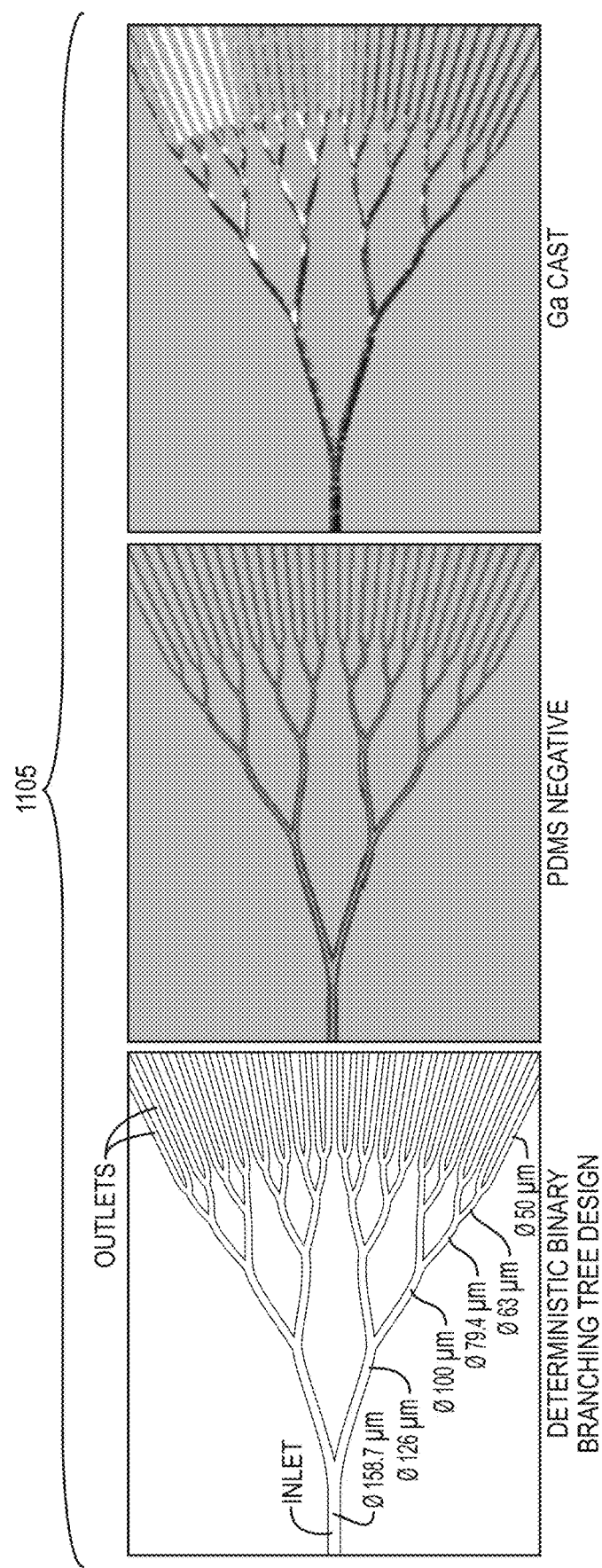

FIGS. 11A-11B show embodiments illustrating hierarchical branching trees with both perfused and dead-ended sections. FIG. 11A shows embodiment 1100 depicting a branching vessel architecture 1101 with a 10-fold reduction in vessel caliber. The vessels are dimensioned according to Murray's law (with exponent 2.96) at each branching hierarchy. Image 1102 of FIG. 11A shows tilted-angle SEM images of the printed structure, scale bar 200 μm. Image 1103 of FIG. 11A shows a SEM image of the smallest branches of the gallium cast. Images 1104 of FIG. 11A shows a tile scan of the device showing the cell nuclei and VE-cadherin. The insets show vessel cross-sections at different regions of the device, scale bar 200 μm. The close-up images at the bottom of 1104 show a branch point and cells sprouting from the blunt ends at ~60 μm sized vessels, scale bars 50 μm.

FIG. 11B shows a design of a deterministic tree 1105 with symmetric bifurcations with each vessel (perfusable).

Figure 12:
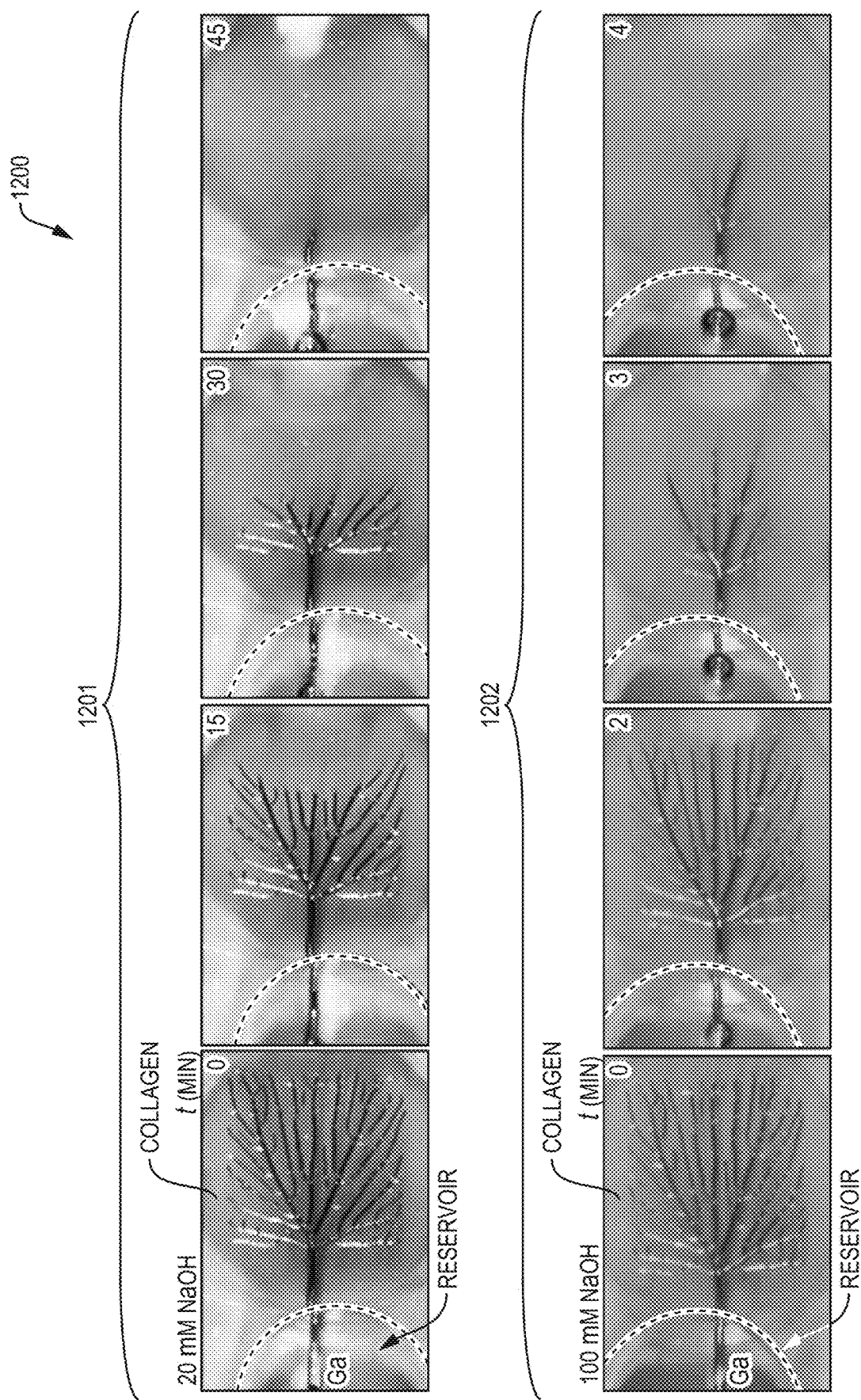
FIG. 12 illustrates the effect of NaOH concentration on the gallium retraction process in an example branched vascular structure.

FIG. 12 illustrates an embodiment 1200 of the gallium retraction process. The upper panel 1201 shows time course images of the gallium retraction process with 20 mM NaOH. The lower panel 1202 shows time course images of the gallium retraction process with 100 mM NaOH. As can be seen, when high concentrations of NaOH are used, the retraction process is expedited, showing that the retraction rate is determined by how the surface oxide is spatially removed and not limited by the evacuation rate of liquid gallium through the central root.

The ESCAPE process faces a distinct challenge when dealing with closed topologies, such as tubes that split and merge, as illustrated in FIG. 7A (701). In this scenario, the liquid gallium must break at each loop for extraction, as shown in FIG. 7B (702). It may be observed that gallium reliably breaks if the Laplace pressure of the collecting droplet (far left of FIG. 7B, 702) is lower than the driving Laplace pressure. This aspect becomes beneficial for evacuating topologies that branch and remerge, where the driving Laplace pressure decreases at junctions due to one principal curvature approaching 0. Even dead-ended sections are consistently evacuated within hydrogels, unlike non-porous surrounding materials. This is achieved as NaOH penetrates the terminal sections of dead-ends through the bulk, as depicted in FIG. 7C (703*a-b*).

In addition to collagen, fibrin and agarose were employed to demonstrate that the ESCAPE process is adaptable to various surrounding hydrogel materials as depicted in FIG. 7D (704). It was investigated whether exposure to gallium within hydrogels might lead to cytotoxic effects when cells are cultured after gallium removal. To directly assess this, human ECs were cultured in physical contact with gallium droplets for a duration of four days. Live-dead assays did not reveal an increase in cell death and the cells not only survived but also spread and grew directly on top of the gallium droplet. Consequently, any potential remnants of gallium from the ESCAPE process should not pose a cytotoxic risk.

Vasculature is focused on as a prominent use case to showcase the adaptability of this fabrication approach. This is due to the acknowledged challenges associated with fabricating vascular structures of varying scales, as established previously [11-12]. To begin, a theoretical framework was developed to address the evacuation of complex hierarchical vascular networks using sacrificial capillary pumping. Scaling relationships pertaining to capillary pressure, network impedance, evacuation flow rates, and velocities suggest that liquid gallium evacuation through capillary pumps is favored by the inherent branching patterns found in natural vascular systems.

Other needle molding approaches have been utilized for the formation of linear blood vessels [30]. To establish a baseline with these other approaches, endothelial cells (ECs) were introduced into 150 μm-sized ESCAPE-molded tubes and cultured under flow conditions. Immunofluorescence images reveal a uniform cell layer oriented along the longitudinal axis. In smaller 60 μm-sized vessels, a lesser number of ECs are required to cover the vessel (FIG. 5A, 501 showing maximum projections of half a vessel). For assessing the smallest dimensions of vessels reliably covered by ECs, a device tapering from 150 μm to 20 μm (approximately the size of an EC in suspension) can be designed. ECs completely cover sections larger than 25 μm (FIG. 8A, 801) but incomplete coverage becomes apparent at approximately 20 μm.

In the context of sinusoidal vessels (FIG. 5B, 502, and FIG. 8B, 802), cells provide uniform coverage across both the linear and curved sections, aligning themselves along the axis of the vessel. This uniform cell coverage extends to vessel architectures characterized by symmetric branching, as shown in FIG. 5C, 503, even in cases of asymmetric branching with dead ends. The complexity of these vascular structures can be further enhanced through the use of a bidirectional (3, 2) branching design. This design pattern involves branching from a 150 μm parent vessel into three daughter vessels, each of which bifurcates and eventually rejoins, with vessel diameters determined by Murray's Law [31-32] (as illustrated in FIG. 8E, 805). The final dimensions closely align with the intended design, with minor variations resulting from contractile forces exerted by the endothelial cells, which reduce vessel diameters (as seen in FIG. 8F, 806, and FIG. 8G, 807). Notably, successful liquid gallium evacuation is achieved even when constrictions are introduced to this design (FIG. 8H, 808).

Creating intricate interlocking geometries presents a challenge, as they cannot be molded in a single mold or produced as a single piece using traditional nozzle-based methods. Multicomponent molding and multiple-pass printing often result in interface defects. It was considered if traditionally "non-moldable" designs such as an overhand knot are achievable using the ESCAPE process leveraging the high surface tension of gallium. To make such geometries moldable, thin continuous walls that provide support for the entire structure were designed (FIG. 9A, 901). Simultaneously, it was ensured that the thickness of these walls prevented high surface tension gallium from filling the supports (FIG. 9B, 902). This additional support may be necessary to render the geometry moldable. The original knot design and the printed knot designs are presented in FIG. 9C, 903, while the PDMS negative and gallium casts are shown in FIG. 9D, 904 through FIG. 9F, 906. The endothelialized overhand knot formed within a collagen matrix serves as an illustration of the ability to generate topologically complex features using ESCAPE molding (FIG. 5D, 504, FIG. 9G, 907, and FIG. 9H, 908).

Beyond the general architecture of blood vessels, ESCAPE affords control over intricate vascular structures with fine precision. To illustrate this capability, vascular malformations and spherical blebs emerging from the cylindrical walls were fabricated, employing varying offsets as exemplified in FIG. 5D, 504, and FIG. 10A, 1001. These images underscore the ability of ESCAPE process to produce smooth collagen surfaces (as depicted in FIG. 10A, 1002), and marked by well-defined boundaries (evident in the collagen SHG cross-section of FIG. 10A, 1003). Furthermore, ESCAPE molding allows the direct manipulation of local EC alignment within blood vessels. EC alignment is an established determinant of vascular health and physiological function [33]. This level of control has previously posed a substantial challenge when dealing with 3D structures in soft natural extracellular matrices (ECMs). To address this challenge, periodic microscale topographical cues in the form of ridges were introduced, each measuring 10 μm in width and height, patterning the inner wall of the vascular conduit at various orientations θ relative to the vessel axis (FIG. 5E, 505, and FIG. 10B, 1005). These topographical cues facilitated precise control over cell alignment to predetermined angles, as substantiated by the histograms and visual representations in FIG. 10C, 1006.

A variety of branching vascular forms were designed to demonstrate the capabilities in fabricating hierarchical configurations. First, a hierarchical tree with five levels of branching was designed. Each level comprises a parent vessel branching into two dead-end vessels and one continuous-through vessel (as depicted in FIG. 6A, 601, and FIG. 11A, 1101). This design gradually tapers down to a single tube measuring approximately 30 μm in diameter. Overall, this results in a tenfold reduction in vessel caliber, decreasing from an initial 300 μm diameter (refer to the printed designs and gallium casts in FIG. 11A, 1102, and 1103). The post-cell-seeding vessel calibers closely adhere to the original design (FIG. 11A, 1104). Subsequently, a branching tree was engineered each vessel bifurcates into identical vessels, all of which are fully perfusable, this design comprises a single inlet branching into 32 outlets (FIG. 11B, 1105).

Vascular trees described above exhibit a level of orderliness rarely observed in natural vessels. Seeking inspiration from the efficacy of computational space-filling algorithms, a customized variant of the space colonization algorithm [34-35] was developed to fashion vasculature that emulates a more lifelike and natural appearance. In essence, this algorithm employs N virtual cells initially distributed randomly within a confined spatial domain, exerting attraction on the growing branches of a vascular tree until they approach a predefined distance, referred to as the vessel-cell distance (VCD). To create a network of dead-ended trees nourishing a 4 mm×4 mm area, distinct design parameters controlling factors such as the number and density of vessels, their tortuosity, and overall alignment were employed. As an example, one particular design (with N=1000 and VCD=100 μm) culminating in 99 dead-ended branches was realized and can be observed in FIG. 6B, 603. The figure also showcases the vascular tree laden with cells in FIG. 6B, 604, offering close-up views of the branching regions and dead ends. To simulate organ growth, a vascular tree can be synthesized using a marginal growth approach where the boundary targeted for vascularization is progressively expanded. The final design resulting from this process is illustrated in FIG. 6C, 605. It is important to note that ESCAPE molding holds applicability in shaping various organotypic forms even though a majority of examples presented have primarily focused on vasculature. For instance, as seen in FIG. 6C, 606, the technique allows for the creation of a 3D branching ductal geometry lines with epithelial cells featuring open lumens and designed to mimic natural epithelial structures.

Further disclosed are the methods and materials for construction and fabrication of the above disclosed embodiments.

Materials

Polydimethylsiloxane (PDMS) may be formulated by combining the Sylgard 184 base with the curing agent at a 10:1 ratio, utilizing the SYLGARD™ 184 Silicone Elastomer Kit from Dow Inc., MI, USA. The resulting mixture may be degassed and subjected to curing in an oven set at 60° C. for a minimum of two hours, typically extending overnight. Gallium may be used in its as-purchased state, sourced from 50 g tubes, CAS 7440-55-3, Luciteria Science, WA, USA. Solutions of NaOH may be prepared by serial dilution originating from a 5N solution (Sodium Hydroxide 5N, #SS256-500, Thermo Fisher Scientific, MA, USA). This dilution process may be carried out using ultrapure water obtained from the Milli-Q system, Direct-Q UV Remote Water Purification System, MilliporeSigma. Collagen gels (2.5 or 4 mg/ml) may be prepared from high concentration 8-11 mg/ml rat tail collagen I stocks (#354249, Collagen Type I, high concentration, rat tail, Corning Inc., NY, USA) based on a general protocol for forming 3D collagen gels [36]. Collagen may be buffered with a 10× reconstitution buffer (10× RB is made of 2.2 g sodium bicarbonate and 4.8 g HEPES in 100 ml distilled water) and 10×DMEM (#D2429, Sigma-Aldrich), titrated to a pH of nine with 1M NaOH and diluted with phosphate-buffered saline (PBS) to a final concentration (2.5 or 4 mg/ml). All these steps may be conducted within an ice bucket environment. This pre-gel solution may be injected into chambers as desired and left to polymerize overnight at room temperature (RT) in a humid atmosphere to prevent evaporation. Fibrin gels may be formed by first dissolving fibrinogen from bovine plasma (#F8630, Sigma-Aldrich) at a concentration of 5 mg/ml in DPBS (#14287080, Thermo Fisher Scientific) at 37° C. and sterile filtering (0.2 μm filter). The fibrinogen solution may be mixed with thrombin (#T4648, Sigma-Aldrich) at a ratio of 0.1 U of thrombin per mg of fibrinogen and immediately injected into desired regions and left to clot. Agarose gels may be formed by dissolving 5% w/v of ultra-low gelling temperature agarose (#A5030, Sigma-Alrich) in PBS at 60° C. Prior to injection the devices may be cooled (optional) and agarose may be injected into the devices as the solution was cooling.

Cell Culture

Human microvascular endothelial cells (dermal hMVECs; #CC-2813, Lonza, Switzerland) may be cultured and maintained in Microvascular Endothelial Cell Growth Medium-2 (EGM2-MV media: EBM-2 basal media (Lonza) supplemented with the MV2 bullet kit). Human umbilical vein endothelial cells (hUVECs; #C2519A, Lonza) may be cultured and maintained in EGM-2 media (Lonza). hMVECs and hUVECs may be used at passages 4-6. Human epithelial cells (colorectal adenocarcinoma cells, Caco-2; ATCC) were cultured and maintained in a medium containing DMEM/F-12 (#11320033, Thermo Fisher Scientific) supplemented with 10% FBS (#F0926, Fetal Bovine Serum, Sigma-Aldrich) and 1% v/v penicillin-streptomycin (Invitrogen). All cells may be maintained at 37° C. in 5% $CO_2$ in humidified incubators.

Antibodies and Reagents

Anti-VE-cadherin (F-8, 1:500 dilution) may be from Santa Cruz (#sc-9989, Santa Cruz, TX, USA). Anti-VE-cadherin (D87F2, 1:500 dilution, #2500S) and Anti-E-cadherin (24E10, 1:1600 dilution, #3195S) may be from Cell Signaling (Cell Signaling Technologies, MA, USA). Phalloidin conjugated with Alexa Fluor 488 (#A12379), phalloidin conjugated with Alexa Fluor Plus 555 (#A30106), phalloidin conjugated with Alexa Fluor Plus 647 (#A30107) may be purchased from Invitrogen/Thermo Fisher and prepared as a DMSO stock solution (~66 µM) and used at 1:1000 dilution. Anti-mouse and anti-rabbit secondary antibodies with Alexa Fluor Plus 488, 555 and 647 (#A32790, #A32773, #A32733), and DAPI (#D3571) may be from Invitrogen/Thermo Fisher and used at 1:1000 dilution. LIVE/DEAD viability/cytotoxicity kit for mammalian cells may be purchased from Invitrogen/Thermo Fisher (#L3224) and used following the manufacturer recommended protocol.

Gallium Filament Fabrication

150 µm-diameter cylinders may be designed in a computer aided design (CAD) software (SolidWorks, Dassault Systèmes SE, France). These designs may be printed on pre-treated silicon substrates. To prepare silicon substrates for printing, they may be plasma cleaned at 100 W for 30 seconds (EMS Quorum 1050×, EMS, PA, USA) and left overnight in a vacuum desiccator with 20 µL of 3-(trimethoxysilyl) propyl acrylate (#475149 Sigma-Aldrich, MilliporeSigma, MA, USA). The design may be printed on the treated silicon substrate using a commercial two-photon direct laser writing system (Photonic Professional GT, Nanoscribe GmbH, Germany) with a 25× objective with the photoresist IP-Dip (Nanoscibe GmbH). The printed parts may be cleaned in polyethyl glycol mono ether acetate (PGMEA, #484431 Sigma-Aldrich) for 30 minutes to remove uncured resist and rinsed with isopropanol (IPA) followed by Novec™ 7100 (3M Company, MN, USA) and left to dry for two hours or more. To ensure that the printed mold doesn't adhere in subsequent stages, the part may undergo plasma cleaning for 100 W at 30 seconds and may be silanized for three hours in a vacuum desiccator with trichloro(1H,1H,2H,2H-perfluorooctyl) silane (#448931, Sigma-Aldrich). A negative copy of the shape may be realized by polymerizing PDMS around the structure. Subsequently, gallium may be melted at 45° C. and carefully injected into the cylindrical void after which it may be solidified and extracted from within the PDMS to form a freestanding gallium filament.

Gallium Filament Evacuation

The initial test of the ESCAPE process involves the utilization of linear gallium filaments, which may be integrated into a PDMS device comprising a 6-mm wide chamber, as depicted in FIG. 4A (400). The PDMS devices featuring these chambers may be fabricated from negative molds (designed in SolidWorks) and printed commercially (Protolabs, MN, USA). PDMS chambers and glass coverslips may be plasma cleaned at 100 W for 30 seconds, and after a brief cooling period, may be bonded together after placing the gallium filaments to span the chamber. The devices may be allowed to remain overnight in RT. Subsequently, they may undergo cleaning with ethanol. To facilitate gel attachment on the internal surface of the PDMS chambers, the assembled chambers may be treated with a 0.5 mg/ml solution of dopamine hydrochloride in tris buffered saline (diluted from 10× Tris Buffered Saline, #T5912, Sigma-Aldrich, and adjusted to a pH of 8.5 with a 5 N NaOH solution) for a duration of one hour. After this, the devices may be rinsed in DI water, followed by 50% ethanol (in DI water) and ethanol and left to dry in a vacuum chamber for a duration of two hours. Alternatively, the chambers may be treated with poly-L-lysine (PLL) followed by glutaraldehyde to promote collagen binding as described previously [30]. After surface treatment and drying, 2.5 mg/ml collagen pre-gel solution may be prepared as described herein and injected into the gel chambers and left to polymerize overnight at room temperature in a humid environment. On the following day, to prevent any evaporation of water from the gel, PBS may be added to the reservoirs at both ends of the chambers. To initiate the gallium evacuation process, devices may be placed on hotplate (Benchmark) set to 32° C.; the melting of gallium filaments can be observed typically within 2-5 minutes. Then the extra PBS previously added to the end reservoirs may be removed and replaced with NaOH solution of the desired concentration; the right reservoirs may be filled with more liquid to create a pressure head for NaOH solution to reach into the evacuating end. Images may be captured every two seconds (Canon EOS 6D Mark II with macro lens Canon EF 180 mm f/3.5 L Macro USM) and made into a timelapse at 30 Hz.

Second harmonic generation (SHG) characterization of collagen.

The dimensional stability of collagen cavities upon exposure to NaOH solutions may be studied using needle molded collagen gels. 4 mg/ml collagen gels may be polymerized in surface-treated PDMS chambers around 160 µm sized needles (that have been pre-soaked in 0.1% bovine serum albumin solution for 1 hour; prepared from #A2058, Bovine Serum Albumin, Sigma-Aldrich). Following an overnight gelation process, the needles may be removed, leaving cylindrical conduits of 160 µm diameter. The two reservoirs connecting the cylindrical channel may be filled with a total volume of 75 µl of either PBS (control), 10 mM, 20 mM, 50 mM, or 100 mM NaOH solutions and placed on a hot plate at 32° C. for 30 minutes. The filling of the reservoirs is carried out to establish a pressure head, promoting the flow through the channel. Following this treatment, the prepared devices may be removed and rinsed in PBS three times. The architecture of collagen may be analyzed through SHG images that may be obtained with a Leica TCS SP8 MP multiphoton microscope equipped with a tunable (680-1300 nm) fs laser (InSight DeepSee; Spectra-Physics, CA, USA) set to 885 nm excitation. Second harmonic generation signal may be recorded with the HyD-RLD 2-channel detector (non-descanned detection) with the SHG 440 filter cube (BP 440/20 nm and BP 483/32 nm filters) using the HC FLUOTAR L 25×/0.95 and HC APO L U-V-I 10×/0.3 water immersion objectives. The dimensions of the vessel may be analyzed using ImageJ; initially, the central slice of the volumetric stack was identified, and subsequently, the lumen size was measured from the central slice. To gauge bulk collagen intensity, 5 mm wide circular wells may be punched out of ~1 mm thick PDMS sheets that may be then bonded to a glass cover slip. 25 µl of 4 mg/ml collagen may be added to each well and polymerized overnight as described earlier, forming ~1 mm thick collagen gels. These gels may be immersed in different concentrations of NaOH for a duration of 30 minutes at 32° C. Following this treatment, the gels may be rinsed in PBS and imaged. Averaged intensity profiles and bulk average collagen SHG intensity may be computed using MATLAB (MathWorks, MA, USA).

General ESCAPE Process

Initially, the desired geometry may be designed using interactive constructive solid geometry CAD tools (for example, SolidWorks) or procedural CAD modelers, for example, OpenSCAD and Blender 2.91 (Blender Foundation). The geometries may be designed based on a set of design criteria. A version of the original Stanford Bunny model may be downloaded an online repository and used for FIG. 1A, 100, and FIG. 1B 110. To generate the initial mold in this work, a two-photon direct laser writing system (Photonic Professional GT, Nanoscribe GmbH) may be used with a 25× objective with the photoresists IP-Dip and IP-S (Nanoscribe GmbH). The resulting printed molds may be cleaned, surface treated with trichloro (1H,1H,2H,2H-perfluorooctyl) silane. PDMS may be crosslinked around the mold to make the negative structure. For most designs, a PDMS monomer-to-crosslinker ratio of 10:1 may be used (except for the Stanford Bunny design where a 20:1 ratio was employed to make a softer PDMS). The gallium cast may be formed by placing molten gallium on top of a cavity, forming a sealed enclosure, and applying and releasing vacuum. In designs with fine features, upon releasing vacuum, the PDMS negative with infilled gallium may be placed on a hot plate and additional pressure may be applied manually to ensure that liquid gallium reached the smallest regions.

The excess gallium may then be removed with an ethanol-soaked wipe. The PDMS negative with infilled gallium may be cooled to 4° C. after which the supercooled liquid gallium may be brought into contact with a crystalline structure to initiate the solidification process. Once solidified, the solid gallium cast may be separated from the PDMS negative by peeling the PDMS. In cases like the overhand knot, where removing the PDMS negative without deforming the solid gallium cast may be challenging, an alternative method may be employed. The PDMS negative may be etched using a selective etch where a 1:4 ratio of 1M tetrabutylammonium fluoride (TBAF) in tetrahydrofuran (#216143, Sigma-Aldrich) to acetone may be used to etch PDMS; acetone may be used as a solvent due to its low swelling index and that the combination of TBAF and acetone yields a high etch rate [37]. The duration of the etching process may be typically under an hour and may be adjusted based on the size of PDMS to be etched. The gallium cast may be rinsed in ethanol and allowed to dry. Generally, gallium casts may be integrated into PDMS devices with chambers designed to hold the soft gel material. PDMS chambers and glass coverslips (24 mm×30 mm, No. 1, #48393-092, VWR, PA, USA) may be cleaned in a plasma asher (EMS Quorum 1050x, EMS, PA, USA) for 30 seconds at 100 W and set to cool for 1-2 minutes. The PDMS devices may be bonded to the glass coverslips with the gallium cast contained within and may be allowed to bond together over an overnight period. Subsequently, the assembled chambers may undergo treatment with 0.5 mg/ml dopamine hydrochloride in tris buffered saline for one hour, and may be rinsed in DI water, followed by 50% ethanol and ethanol, prior to being placed in a vacuum desiccator for a drying period of two hours. Afterward, the soft gel material of choice (e.g., agarose, collagen or fibrin) may be injected into the gel chambers and surrounding the gallium cast and left to gel. PBS may be added proximal to the devices to prevent evaporation of the hydrogels post gelling.

In order to effectuate evacuation of the gallium cast, the PDMS devices may be positioned on a hot plate maintained at 32° C., initiating the melting of the gallium cast. Continuous monitoring of this process may be carried out using a stereo microscope (ZEISS SteREO Discovery V20 Motorized Stereo Microscope, Carl Zeiss, Germany). Typically, a 10 mM NaOH may be employed to facilitate the removal of the surface oxide layer of gallium, unless otherwise specified. A fluidic pressure head may be established from the retracting end to the collecting end ensuring that NaOH solution reaches all parts of the devices through the interstitial space to remove the surface oxide of gallium effectively. The pressure head may be restored at regular intervals (approx. every 10-15 min) with fresh NaOH solution to ensure flow through the gel interstitial space. Upon the completion of gallium evacuation, the gallium droplets collected in the reservoirs may be removed. The gels and reservoirs may be washed with PBS three times. Following the inspection of the devices in the stereo microscope, fresh PBS may be added to the reservoirs with a pressure head to ensure flow through the cavities and the gels. Subsequently, the devices may be soaked in PBS and stored at 4° C. overnight.

Device Seeding and Culture

PDMS devices containing the soft gels post gallium evacuation through the ESCAPE process may be stored with PBS in the reservoirs at 4° C. On the night before cell seeding, the devices may be brought to room temperature, and the PBS may be removed from the reservoirs and the gel regions. Subsequently, 50 µl of fresh cell culture media specific to the intended cell type (e.g., EGM-2MV for hMVECs) may be added to each media reservoir. The devices may then be transferred to a rocker located inside a tissue culture incubator which is maintained in a humidified environment at 37° C. with 5% $CO_2$, for a duration of at least four hours, and typically spanning overnight. On the day designated for cell seeding, cells may be detached from cell culture dishes utilizing 0.05% trypsin/EDTA (Gibco) and subjected to centrifugation at 200 g for four minutes. Subsequently, the cells may then be resuspended in the growth medium at a density of $1 \times 10^6$ cells/ml, a value quantified with a hemocytometer. A total 50-70 µl of cell suspension may be distributed across the two reservoirs allowing the cells to flow into the gel conduits. The devices may be occasionally flipped and turned for cells to reach different parts of the conduits over the course of about five minutes. Following this step, the devices may be stored in the incubator for 15-30 minutes for the cells to adhere. Subsequent to this attachment step, the surplus cell solution may be withdrawn from the reservoirs and 50 µl of cell culture media may introduced into each reservoir. The devices may then be positioned on a rocker within the incubator. Daily changes of the culture medium may be implemented, and the devices may be observed through a brightfield microscope for cell confluence. Typically, full confluence may be achieved within two to three days post-seeding.

Immunofluorescence and Microscopy

Devices containing cell-lined vessels and cavities may undergo fixation with a 4% paraformaldehyde solution (Electron Microcopy Sciences) in PBS for a duration of 15-30 minutes. Following this, devices may then be washed with PBS and subjected to permeabilization with 0.15% Triton X-100 (Sigma-Aldrich) for a similar time frame at room temperature in the presence of a pressure head to ensure that solution penetration throughout the device. Subsequently, the devices may then be blocked with 3% BSA for one hour at room temperature or overnight at 4° C. The devices may then be washed in PBS thrice and primary antibodies and phalloidin in 3% BSA may then be added to the device and left overnight at 4° C. The following day, two PBS washes may be carried out and fresh PBS may be introduced into the device ports and maintained at 4° C. in the presence of a fluidic pressure head for a period of two hours. The solution may then be substituted with the secondary antibodies in 3% BSA and stained overnight at 4° C. On the next day, the devices may be washed thrice in PBS and cell nuclei marked with DAPI for one hour after which further PBS washing may be performed. Immunofluorescence images of the devices may be captured using a Leica TCS SP8 MP multiphoton microscope with the HC FLUOTAR L 25×/0.95 and HC APO L U-V-I 10×/0.3 water immersion objectives. Tile scans may be controlled and acquired at constant laser intensity using the LAS-X software (Leica). Images may be adjusted uniformly for contrast and brightness using ImageJ. ImageJ may also be used to generate composite images, z-projections, depth-coded images, and stitch tile scans. 3D volumetric views of the vascular malformation (1004) may be generated with Imaris 9.7.2 (Oxford Instruments, UK). Brightfield images may be acquired using a Nikon Eclipse TE200 microscope. Scanning electron microscope (SEM) images may be acquired with a Field Emission Scanning Electron Microscope Zeiss Supra 55VP (Carl Zeiss, Germany); prior to SEM imaging samples may optionally undergo surface coating with Au/Pd using a Cressington 108 sputter coater (Cressington, UK).

Comparing ESCAPE in porous hydrogels versus non-porous materials.

In order to assess and compare the efficiency of the ESCAPE process within conduits embedded in hydrogels and non-porous materials, a design of a vessel that branches into two daughter vessels, one of which is dead ended may be used (FIG. 7A, 701b). The fabrication of the gallium casts followed previously described procedures. These casts were assembled into PDMS devices with dedicated chambers to hold the gels. 5% agarose served as the porous gel material and PDMS was used as the non-porous material. Gallium evacuation was carried out within the agarose gel with 10 mM NaOH solution. Given the greater affinity of gallium for PDMS in comparison to water-based gels, coupled with the inherent hydrophobic nature of PDMS, a higher concentration of NaOH (100 mM) was employed to effectively switch the surface tension of gallium.

Live-Dead Assay

The impact of culturing cells in direct contact with gallium may be assessed through the following procedure. Approximately ~5 mm sized droplets of gallium were added onto the central regions of the wells in a 6-well plate. Culture media was introduced into these wells and pre-warmed following which hMVECs and hUVECs were seeded at low confluence (~20%). The cells were then subjected to a four-day culture period, during which the cell culture medium was replaced once every two days following the initial cell seeding. The live/dead assay was conducted using the cell viability kit following the recommended protocol and imaged from the top using the Leica TCS SP8 MP multiphoton microscope.

Quantifying Actin Alignment

For the analysis of the actin alignment a systematic process may be implemented. Initially, from the volumetric images of the vessels, the central slice may be identified in ImageJ and the maximum z-projection of one half of the vessel was obtained. An automated approach may be used to quantify the overall alignment of actin filaments in the vessels with the topographical cues (FIG. 5E, 505, and FIG. 10B, 1005). The F-actin channel of the maximum z-projection images may be loaded into a software such as, for example MATLAB, and a 20 µm long structuring element (angle iteratively varied from 0° to 360° in 1° increments) may be used to perform a morphological opening of the image. From the central portion of the vessel, the pixels in the actin image displaying a significant degree of alignment may be automatically assessed from the morphological opening intensities. The direction of peak alignment may be recorded from these regions and a polar histogram was subsequently generated to provide a visual representation of the orientation of the actin bundles.

Deterministic Branching Vascular Tree Designs

The branching tree with five hierarchical levels with two dead-ended branches and one through branch at each level (FIG. 5E, 505) many be designed procedurally in, for example, OpenSCAD, such that $\Sigma r^n$ is conserved where the exponent n=3 in ideal Murray's law. For the design in FIG. 6A, 601, an exponent of n=2.96 may be used to demonstrate that n can be varied in design easily. The fully perfusable branching tree design exemplified in FIG. 11B, 1105 featuring a single inlet and thirty-two outlets may be generated using the Blender Python API (Blender Foundation). The vessel calibers may be based on the ideal Murray's law exponent n=3.

Design of Space Colonization Trees

Vascular structures may be computationally designed and generated through the utilization of a custom implementation of the space colonization algorithm [34-35] in Blender with the Python API. The process involves first generating a set of N virtual cells (or attractors) that may be randomly distributed within a specific boundary. The boundary may be defined to be a 4 mm×4 mm square region. The starting node of the tree may be defined to be near (or inside) this boundary or any preferred location. The tree may be grown iteratively such that all the cells are 'nourished', i.e., the virtual cells are within a predefined vessel-cell distance (VCD) from the branches of the vascular tree. This design principle closely mimics the natural arrangement observed in living tissues where cells typically reside within a diffusion length away from the surrounding blood vessels.

In each iteration of the process, virtual cells situated within a predetermined distance-of-influence (DOI) but not nourished by the vascular tree (i.e., beyond the VCD from any of the branches of the tree) may attract the node closest to them. Cells located outside the DOI may be considered to be too far to exert influence on the growth of the vascular tree. New segments of the tree may be added from all the nodes attracted by cells towards the average direction of all attracting cells (a directional vector known as the growth vector). Optionally, random noise and tortuosity factor (TF) may be added to the growth vector in this step of the algorithm to make the vessel segments to be tortuous. The step size parameter is the spacing between the nodes during the tree growth. This iterative growth process persists until all cells are positioned within the VCD from the vascular tree or until a predefined maximum iteration limit is reached. The outcome of this procedure is a skeletal representation of the tree structure. This generated tree skeleton is subject to an automated cleaning process to eliminate single-segment branches. Following the cleanup, the tree is adjusted in size according to natural scaling laws. The terminal branches of the tree may be designed to possess a radius of 25 µm, and all parent vessels may be sized such that $\Sigma r^3$ is conserved. The vascular tree fabricated using ESCAPE (FIG. 7C, 703a-b, FIG. 7D, 704, and FIG. 12, 1200) may be generated with the following parameters: 4 mm×4 mm boundary, N=1000 cells, DOI=1000 µm, VCD=100 µm, step size=50 µm, radius of terminal vessels=25 µm.

The overall boundary was kept fixed throughout the iterations in the above disclosed embodiments. To simulate organ growth, the boundary of the vascular tree may be expanded each iteration as desired, at a defined growth rate. This is designated as marginal growth. The marginal growth tree design in FIG. 6C, 605 was generated using the sector of a circle (with sector angle 53.1°) as the boundary. The radius of the sector was grown at a rate of 12.5 µm with each iteration until the radius reached a value of 4 mm. Virtual cells may be introduced into the expanding boundary at a uniform areal density. The marginal growth tree was generated with the following parameters: total N=10000 cells, DOI=1000 µm, VCD=150 µm, a radius growth rate of 12.5 µm/iteration, a step size of 50 µm, and terminal vessel radii measuring 25 µm.

Gallium Evacuation Rates During ESCAPE in Large Vascular Trees

Space colonization vascular trees may be fabricated following the procedures outlined in the section 'General ESCAPE process'. In the case of large vascular tree designs, e.g., in the designs of FIGS. 7A-7E, a situation arises during the gallium evacuation phase of the ESCAPE process where liquid gallium flows out from all the terminal branches and is collected through a single central root vessel. To investigate whether the gallium evacuation process during ESCAPE is constrained by the flow rates through this central vessel, a comparison was made between evacuations with 20 mM NaOH and 100 mM NaOH solutions, as depicted in FIG. 12 (1200). When exposed to high concentrations of NaOH, the surface oxide on all branches is effectively removed, resulting in simultaneous evacuation of all terminal branches, unlike the more directional evacuation observed at lower concentrations. This experiment demonstrates that the evacuation of liquid gallium is not limited by the flow rate of liquid exiting through the parent vessel but rather by the number of terminal branches being actively pumped out concurrently.

REFERENCES

[1] Weibel, E. R. It takes more than cells to make a good lung. American Journal of Respiratory and Critical Care Medicine 187, 342-346 (2013).
[2] Buckberg, G., Hoffman, J. I. E., Mahajan, A., Saleh, S. & Coghlan, C. Cardiac mechanics revisited: The Relationship of Cardiac Architecture to Ventricular Function. Circulation 118, 2571-2587 (2008).
[3] Grigoryan, B. et al. Multivascular networks and functional intravascular topologies within biocompatible hydrogels. Science 364, 458-464 (2019).
[4] Lee, A. et al. 3D bioprinting of collagen to rebuild components of the human heart. Science 365, 482-487 (2019).
[5] Skylar-Scott, M. A. et al. Biomanufacturing of organ-specific tissues with high cellular density and embedded vascular channels. Science Advances 5, (2019).
[6] McKinnon, D. D., Brown, T. E., Kyburz, K. A., Kiyotake, E. & Anseth, K. S. Design and characterization of a synthetically accessible, photodegradable hydrogel for user-directed formation of neural networks. Biomacromolecules 15, 2808-2816 (2014).
[7] Brandenberg, N. & Lutolf, M. P. In situ patterning of microfluidic networks in 3D cell-laden hydrogels. Advanced Materials 28, 7450-7456 (2016).
[8] Arakawa, C. K., Badeau, B. A., Zheng, Y. & DeForest, C. A. Multicellular vascularized engineered tissues through user-programmable biomaterial photodegradation. Advanced Materials 29, 1703156 (2017).
[9] Daly, A. C., Prendergast, M. E., Hughes, A. J. & Burdick, J. A. Bioprinting for the biologist. Cell 184, 18-32 (2021).
[10] Pradhan, S., Keller, K. A., Sperduto, J. L. & Slater, J. H. Fundamentals of laser-based hydrogel degradation and applications in Cell and Tissue Engineering. Advanced Healthcare Materials 6, 1700681 (2017).
[11] O'Connor, C., Brady, E., Zheng, Y., Moore, E. & Stevens, K. R. Engineering the multiscale complexity of vascular networks. Nature Reviews Materials 7, 702-716 (2022).
[12] Traore, M. A. & George, S. C. Tissue Engineering the Vascular Tree. Tissue Engineering Part B: Reviews 23, 505-514 (2017).
[13] Truby, R. L. & Lewis, J. A. Printing soft matter in three dimensions. Nature 540, 371-378 (2016).
[14] Zheng, X. et al. Ultralight, ultrastiff mechanical metamaterials. Science 344, 1373-1377 (2014).
[15] Keating, S. J., Leland, J. C., Cai, L. & Oxman, N. Toward site-specific and self-sufficient robotic fabrication on architectural scales. Science Robotics 2, (2017).
[16] Bertassoni, L. E. et al. Hydrogel bioprinted microchannel networks for Vascularization of Tissue Engineering constructs. Lab Chip 14, 2202-2211 (2014).
[17] Jiménez-Torres, J. A., Peery, S. L., Sung, K. E. & Beebe, D. J. LumeNEXT: A practical method to pattern luminal structures in ECM Gels. Advanced Healthcare Materials 5, 198-204 (2015).
[18] Kolesky, D. B., Homan, K. A., Skylar-Scott, M. A. & Lewis, J. A. Three-dimensional bioprinting of thick vascularized tissues. Proceedings of the National Academy of Sciences 113, 3179-3184 (2016).
[19] Miller, J. S. et al. Rapid casting of patterned vascular networks for perfusable engineered three-dimensional tissues. Nature Materials 11, 768-774 (2012).
[20] Zheng, Y. et al. In vitro microvessels for the study of angiogenesis and thrombosis. Proceedings of the National Academy of Sciences 109, 9342-9347 (2012).
[21] Tang, S.-Y., Tabor, C., Kalantar-Zadeh, K. & Dickey, M. D. Gallium Liquid Metal: The devil's elixir. Annual Review of Materials Research 51, 381-408 (2021).
[22] Lin, Y. et al. Vacuum filling of complex microchannels with Liquid Metal. Lab on a Chip 17, 3043-3050 (2017).
[23] Khan, M. R., Eaker, C. B., Bowden, E. F. & Dickey, M. D. Giant and switchable surface activity of liquid metal via surface oxidation. Proceedings of the National Academy of Sciences 111, 14047-14051 (2014).
[24] Ma, J. et al. Shaping a soft future: Patterning liquid metals. Advanced Materials 35, 19 (2023).
[25] Pourbaix, M. Atlas of Electrochemical Equilibria in aqueous solutions. (NACE International, 1974).
[26] Hardy, S. C. The surface tension of liquid gallium. Journal of Crystal Growth 71, 602-606 (1985).
[27] Walker, G. M. & Beebe, D. J. A passive pumping method for microfluidic devices. Lab on a Chip 2, 131 (2002).
[28] Style, R. W., Jagota, A., Hui, C.-Y. & Dufresne, E. R. Elastocapillarity: Surface tension and the mechanics of soft solids. Annual Review of Condensed Matter Physics 8, 99-118 (2017).
[29] Bico, J., Reyssat, 1. & Roman, B. Elastocapillarity: When surface tension deforms elastic solids. Annual Review of Fluid Mechanics 50, 629-659 (2018).
[30] Polacheck, W. J., Kutys, M. L., Tefft, J. B. & Chen, C. S. Microfabricated blood vessels for modeling the Vascular Transport Barrier. Nature Protocols 14, 1425-1454 (2019).
[31] Murray, C. D. The physiological principle of minimum work. Proceedings of the National Academy of Sciences 12, 207-214 (1926).
[32] Sherman, T. F. On connecting large vessels to small: the meaning of Murray's law. The Journal of general physiology 78, 431-453 (1981).

[33] Wang, C., Baker, B. M., Chen, C. S. & Schwartz, M. A. Endothelial cell sensing of Flow Direction. Arteriosclerosis, Thrombosis, and Vascular Biology 33, 2130-2136 (2013).

[34] Runions, A. et al. Modeling and visualization of leaf venation patterns. ACM Transactions on Graphics 24, 702-711 (2005).

[35] Runions, A., Lane, B. & Prusinkiewicz, P. Modeling trees with a space colonization algorithm. In Proc. 3rd Eurographics Workshop on Natural Phenomena, 63-70 (2007).

[36] Doyle, A. D. Generation of 3D collagen gels with controlled diverse architectures. *Current Protocols in Cell Biology* 72, 1 (2016).

[37] Kleiman, M., Ryu, K. A. & Esser-Kahn, A. P. Determination of factors influencing the wet etching of polydimethylsiloxane using tetra-n-butylammonium fluoride. *Macromolecular Chemistry and Physics* 217, 284-291 (2015).

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method of forming a three-dimensional (3D) structure in a material, the method comprising:
   directing a liquid casting material into a mold cavity of a mold structure, the mold cavity corresponding to a three-dimensional (3D) structure;
   causing the liquid casting material to solidify within the mold cavity to form a solid structure of the casting material;
   removing at least a portion of the mold structure from the solid structure of the casting material;
   forming a structural material around the solid structure of the casting material;
   liquifying the solid casting material within the structural material; and
   evacuating the liquified casting material from the structural material by increasing a surface tension of the liquified casting material, to form the 3D structure in the structural material.

2. The method of claim 1, wherein the mold structure comprises a soft material, an elastomer mold, or any combination thereof.

3. The method of claim 2, wherein the structural material comprises a soluble material, an etchable material, a porous material, a soft biomaterial, a hydrogel, a gel, a material allowing a base or an acid to flow through said material, or any combination thereof.

4. The method claim 2, further comprising creating the mold cavity by:
   forming a solid mold of a 3D biological structure;
   encasing the solid mold in an elastomer to form an elastomer mold; and
   separating the solid mold from the elastomer to create the mold cavity in the elastomer mold.

5. The method of claim 4, wherein forming the solid mold comprises:
   designing a mold cavity geometry to allow for the liquid casting material to be evacuated from the structural material as a unitary piece or droplet, such that the casting material maintains continuity throughout the evacuation; and
   forming the 3D mold according to the designed mold cavity geometry.

6. The method of claim 1, wherein
   the increasing of the surface tension of the liquified casting material causes a Laplacian pressure difference in the liquified casting material; and wherein evacuating the liquid casting material comprises:
   extracting the liquified casting material from the structural material by using capillary forces, wherein the capillary forces are dependent on the Laplacian pressure difference.

7. The method of claim 1, wherein the surface tension of the liquified casting material is increased by removing a surface oxide of the liquified casting material.

8. The method of claim 1, wherein the surface tension of the liquified casting material is increased by exposing the liquified cast material to an acid or a base.

9. The method of claim 1, wherein the surface tension of the liquified casting material is increased by exposing the liquified casting material to an electrical current or voltage.

10. The method of claim 1, wherein the surface tension of the liquified casting material is increased by exposing the liquified casting material to a mechanical force.

11. The method of claim 1, wherein the surface tension of the liquified casting material is increased by exposing the liquified casting material to a vibration.

12. The method of claim 1, wherein the structural material formed around the solid structure of the cast material comprises at least one port configured to allow for the insertion or removal of a viscous material.

13. The method of claim 1, wherein the 3D structure comprises a geometry containing closed-loop geometries, the method further comprising designing at least one narrow continuous wall under the closed-loop geometry structure for support.

14. The method of claim 1, wherein evacuating the liquified casting material comprises causing a bulb of the liquid casting material to collect at an exit of the structural material to prevent the internal pressure of the liquified cast material from deforming the structural material.

15. The method of claim 1, wherein the casting material comprises a metal.

16. The method of claim 15, wherein the casting material is characterized by a melting point within a specified proximity of temperature to that of a predefined cell culture.

17. The method of claim 15, wherein the liquified casting material further comprises a tunable surface oxide, wherein removing the tunable surface oxide increases the surface tension of the liquified casting material enabling the use of capillary forces to demold the 3D structure via extraction of the casting material.

18. The method of claim 15, wherein the casting material has a coefficient of surface tension, wherein liquifying the casting material and increasing its surface tension causes a Laplacian pressure difference throughout the liquified casting material and allowing the liquified casting material to evacuate the structural material in a unitary piece or droplet.

19. The method of claim 15, wherein the metal is Gallium.

20. The method of claim 1, wherein the 3D structure is a multiscalar biological structure.

21. The method of claim 1, further comprising inserting biological cells into the 3D structure in the structural material, or on the surface of the 3D structure, thereby forming an artificial biological structure.

22. A method of forming a multiscalar, three-dimensional (3D) structure in a material, the process comprising:
- causing a liquid casting material to solidify within a mold cavity of an elastomer mold to form a solid structure of the casting material within the mold cavity, the mold cavity corresponding to a multiscalar, three-dimensional (3D) structure;
- separating the elastomer mold and the solid structure of the casting material;
- forming a structural material around the solid structure of the casting material;
- liquifying the solid casting material within the structural material; and
- evacuating the liquified casting material from the structural material by increasing a surface tension of the liquified casting material, creating a hollow interior having the multiscalar 3D structure within the structural material.

23. The method of claim 22, wherein the multiscalar, 3D structure comprises any branched (ductal) tree structure, and the hollow interior of the structural material comprises a hollow form of the branched (ductal) tree structure.

24. The method of claim 22, wherein the multiscalar, 3D structure comprises a branched vessel having one or more branches obeying Murray's Law.

25. The method of claim 22, wherein the multiscalar, 3D structure comprises a vessel having groves to control alignment of, or behavior of biological cells added to the vessel.

26. The method of claim 22, wherein evacuating the liquified casting material comprises:
- increasing the surface tension of the liquified casting material by removing a surface oxide of the liquified casting material, the increasing of the surface tension of the liquified casting material causing a Laplacian pressure difference in the liquified casting material; and
- extracting the liquified casting material from the structural material by using capillary forces that are dependent on the Laplacian pressure difference.

27. The method of claim 26, wherein a concentration of sodium hydroxide is used to remove the surface oxide of the liquified casting material.

28. The method of claim 22, further comprising creating the mold cavity by:
- designing a 3D mold of a biological structure;
- encasing the 3D mold in an elastomer; and
- removing the 3D mold from the elastomer, creating a cavity of the 3D mold in the elastomer.

29. The method of claim 22, further comprising inserting biological materials into the hollow interior of the structural material, thereby forming an artificial biological structure.

30. The method of claim 22, wherein the structural material comprises a soluble material, an etchable material, a porous material, a soft biomaterial, a hydrogel, a gel, a material allowing a base or an acid to flow through said material, or any combination thereof.

* * * * *